US010780361B2

(12) United States Patent
Zhao et al.

(10) Patent No.: US 10,780,361 B2
(45) Date of Patent: Sep. 22, 2020

(54) COLLISION JUDGMENT SYSTEM, METHOD, APPARATUS, AND DEVICE

(71) Applicant: TENCENT TECHNOLOGY (SHENZHEN) COMPANY LIMITED, Shenzhen (CN)

(72) Inventors: Ming Zhao, Shenzhen (CN); Sixi Lu, Shenzhen (CN); Lu Liu, Shenzhen (CN); Yanqing Jing, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 290 days.

(21) Appl. No.: 15/860,351

(22) Filed: Jan. 2, 2018

(65) Prior Publication Data

US 2018/0117480 A1    May 3, 2018

Related U.S. Application Data

(63) Continuation of application No. PCT/CN2016/098968, filed on Sep. 14, 2016.

(30) Foreign Application Priority Data

Oct. 19, 2015 (CN) .......................... 2015 1 0680674

(51) Int. Cl.
| A63H 17/26 | (2006.01) |
| A63H 17/395 | (2006.01) |
| G01D 21/00 | (2006.01) |
| A63H 17/045 | (2006.01) |
| A63H 27/00 | (2006.01) |
| A63H 30/04 | (2006.01) |

(52) U.S. Cl.
CPC ........... *A63H 17/26* (2013.01); *A63H 17/045* (2013.01); *A63H 17/395* (2013.01); *A63H 27/02* (2013.01); *A63H 30/04* (2013.01); *G01D 21/00* (2013.01)

(58) Field of Classification Search
CPC .... A63H 17/26; A63H 17/045; A63H 17/395; A63H 27/02; A63H 30/04; G01D 21/00;
(Continued)

(56) References Cited

U.S. PATENT DOCUMENTS

2005/0250413 A1    11/2005  Lo et al.
2010/0085238 A1*   4/2010  Muller-Frahm ...... G01S 13/867
                                                    342/70
(Continued)

FOREIGN PATENT DOCUMENTS

CN    102652078 A    8/2012
CN    103373350 A    10/2013
(Continued)

OTHER PUBLICATIONS

The World Intellectual Property Organization (WIPO) International Search Report for PCT/CN2016/098968 dated Dec. 14, 2016 8 Pages (including translation).
(Continued)

*Primary Examiner* — Krishnan Ramesh
(74) *Attorney, Agent, or Firm* — Anova Law Group, PLLC

(57) ABSTRACT

The present disclosure provides a collision judgment method and apparatus. The method includes: determining, by a moving device, according to acceleration data collected by an acceleration sensor, that the moving device collides; sending collision information to the corresponding control device, including at least a moving device identifier and a collision time; sending, by the corresponding control device, the collision information to a collision judgment device; detecting, by the collision judgement device, whether at least two collision information sent by the at least two control devices is received within a predetermined time interval; when the at least two collision information is
(Continued)

received within the predetermined time interval, and a difference between collision times carried in the at least two collision information is less than a preset threshold, determining that moving devices corresponding to moving device identifiers carried in the at least two collision information collided with one other.

13 Claims, 13 Drawing Sheets

(58) Field of Classification Search
CPC ............ G05F 13/376; G05D 1/0088; G06K 9/00805; B60W 30/095; B60W 30/20
USPC ........................................ 701/300
See application file for complete search history.

(56) References Cited

U.S. PATENT DOCUMENTS

| | | | |
|---|---|---|---|
| 2012/0310485 A1* | 12/2012 | Lang | B60R 21/0132 701/46 |
| 2014/0032093 A1 | 1/2014 | Mills | |
| 2014/0100710 A1 | 4/2014 | Clark et al. | |
| 2015/0127570 A1* | 5/2015 | Doughty | G06Q 50/265 705/325 |
| 2015/0307048 A1* | 10/2015 | Santora | B60R 1/00 348/148 |

FOREIGN PATENT DOCUMENTS

| | | |
|---|---|---|
| CN | 103813322 A | 5/2014 |
| CN | 103863235 A | 6/2014 |
| CN | 104021601 A | 9/2014 |
| CN | 104031601 A | 9/2014 |
| CN | 204107041 U | 1/2015 |
| CN | 104713692 A | 6/2015 |
| CN | 104828005 A | 8/2015 |
| CN | 105300439 A | 2/2016 |
| DE | 102009001027 A1 | 8/2010 |
| DE | 102009047071 A1 | 5/2011 |

OTHER PUBLICATIONS

The State Intellectual Property Office of the People's Republic of China (SIPO) Office Action 1 for 201510680674.5 dated Mar. 20, 2017 14 Pages (including translation).

* cited by examiner

COLLISION JUDGMENT SYSTEM, METHOD, APPARATUS, AND DEVICE

CROSS-REFERENCES TO RELATED APPLICATIONS

This application is a continuation application of PCT Patent Application No. PCT/CN2016/098968, filed on Sep. 14, 2016, which claims priority to Chinese Patent Application No. 201510680674.5, filed with the Chinese Patent Office on Oct. 19, 2015 and entitled "collision judgment system, method, and apparatus", which is incorporated herein by reference in its entirety.

FIELD OF THE TECHNOLOGY

Embodiments of the present disclosure relate to the field of data processing, and in particular, to a collision judgment system, method, apparatus, and device.

BACKGROUND OF THE DISCLOSURE

With development of a remote control technology, people may control, by using a control device having a remote control function, moving devices to battle with each other. A moving device may be an intelligent battle toy car, an intelligent battle toy tank, or the like.

The moving device may collide in a battle process, and the moving device after the collision performs a corresponding operation, for example, creating a prompt tone or stopping a movement. A moving device in a related technology detects, by using several sensors that are set on the peripheral side, whether collision has happened. Specifically, when receiving a collision signal triggered later by a sensor, the moving device determines that the collision has happened.

In a process of implementing the embodiments of the present disclosure, the inventor discovers that the foregoing technology has at least the following problem: a moving device can only determine, according to a collision signal, whether collision happens, and cannot further determine whether a collision object is a moving device or an obstacle. In addition, positions of sensors are scattered on the moving device, and therefore a relatively large collision detection blind area exists.

SUMMARY

To resolve the foregoing technical problem, embodiments of the present disclosure provide a collision judgment system, method, apparatus, and device. The technical solutions are as follows:

According to one aspect of the embodiments of the present disclosure, a collision judgment method is provided, and is applied to a collision judgment device, at least two moving devices each having an acceleration sensor, and at least two control devices respectively corresponding to each moving device. The method includes: determining, by a moving device, according to acceleration data collected by the acceleration sensor, whether the moving device collides; when determining that the moving device collides, sending, by the moving device, collision information to the corresponding control device, the collision information comprising at least a moving device identifier and a collision time; sending, by the corresponding control device, the collision information to the collision judgment device; detecting, by the collision judgement device, whether at least two colli-sion information sent by the at least two control devices is received within a predetermined time interval; when the at least two collision information sent by the at least two control devices is received within the predetermined time interval, and a difference between collision times carried in the at least two collision information is less than a preset threshold, determining, by the collision judgement device, that moving devices corresponding to moving device identifiers carried in the at least two collision information collided with one other.

According to another aspect of the embodiments of the present disclosure, a collision judgment apparatus used in a moving device is provided, the apparatus including: an acceleration sensor; a memory; a processor coupled to the memory, the processor being configured for: collecting acceleration data by using the acceleration sensor; determining, according to the acceleration data, whether the moving device collides; and when determining that the moving device collides, sending collision information to a corresponding control device, the collision information comprising at least a moving device identifier and a collision time, such that a collision judgment device determines the moving device collides with another moving device based on the collision information from the corresponding control device.

According to another aspect of the embodiments of the present disclosure, a collision judgment apparatus used in a collision judgment device is provided, the apparatus including: a memory; and a processor coupled to the memory, the processor being configured for: receiving collision information sent by a control device, the collision information being sent by a moving device to the control device, the collision information comprising at least a moving device identifier and a collision time; detecting whether the collision information sent by the at least two control devices is received within a predetermined time interval; and when at least two of the collision information is received from at least two control devices within the predetermined time interval, and a difference between the collision times carried in at least two of the collision information is less than a preset threshold, determining that moving devices corresponding to the moving device identifiers carried in the at least two of the collision information collide with one other.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make objectives, technical solutions, and advantages clearer, the following further describes implementations of the present disclosure in detail with reference to the accompanying drawings.

System Environment

Figure 1:
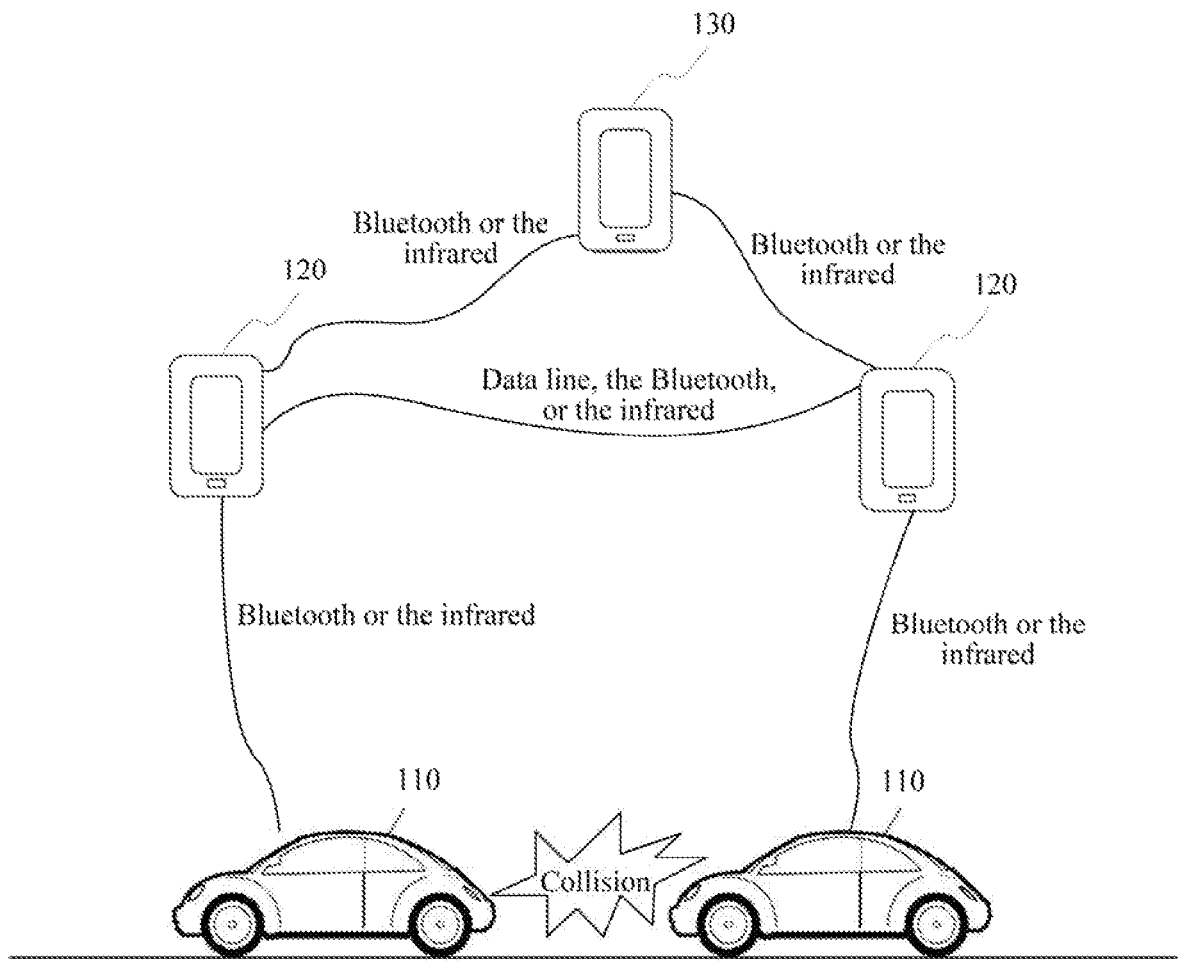
FIG. 1 is a schematic structural diagram of a collision judgment system according to an embodiment of the present disclosure.

Referring to FIG. 1, FIG. 1 is a schematic structural diagram of a collision judgment system according to an embodiment of the present disclosure. The system includes at least two moving devices 110, a control device 120 and a collision judgment device 130 that are respectively corresponding to each moving device 110.

The moving device 110 may be an intelligent battle toy car, an intelligent battle toy tank, an intelligent battle toy plane, or the like. As used herein, the moving device may also be referred as battle device. This embodiment provides descriptions by using an example in which the moving device 110 is an intelligent battle toy car, and does not constitute a limitation on the present disclosure. An acceleration sensor is set inside the moving device 110, to collect acceleration data that is in a movement process. In a possible implementation, an angular velocity sensor may be further set in the moving device 110, to collect angular velocity data that is in a movement process. A wireless transmission module may be further set in the moving device 110, to send collision information to a corresponding control device 120 when collision happens. It should be noted that, wireless connections such as the Bluetooth and the infrared may be further established between moving devices 110. This is not limited in the present disclosure.

A moving device 110 is connected to a corresponding control device 120 by using the Bluetooth or the infrared.

An application program used to control the moving device 110 is run in the control device 120. The control device 120 may be a smartphone, a tablet computer, an e-book reader, a Moving Picture Experts Group Audio Layer III (MP3) player, a Moving Picture Experts Group Audio Layer IV (MP4) player, a laptop computer, or the like. In FIG. 1, descriptions are provided by using an example in which the control device 120 is a smartphone, and a limitation on the present disclosure is not constituted. It should be noted that, different control devices 120 may be further connected by using a data line, the Bluetooth, or the infrared, and transmit data to each other.

A collision judgment device 130 is connected to the control devices 120 by using the Bluetooth or the infrared.

The collision judgment device 130 is an electronic device that has a data processing function and an information sending function. The electronic device may be a smartphone, a tablet computer, an e-book reader, an MP3 player, an MP4 player, a laptop computer, or the like. In FIG. 1, descriptions are provided by using an example in which the collision judgment device is a smartphone. It should be noted that, the collision judgment device 130 may alternatively be any control device 120, that is, a control device 120 in the system has both a collision judgment function and a control function. This is not limited in the present disclosure. In addition, the collision judgment device 130 may alternatively be a server that is connected to the control devices 120 by using a wired or wireless network. This is not limited in the present disclosure.

It should be noted that, this embodiment provides descriptions by using an example in which the collision judgment system includes only two moving devices. In an actual implementation process, the collision judgment system may further include more than two moving devices. The present disclosure does not limit a quantity of moving devices.

Computer Architecture

Figure 2:
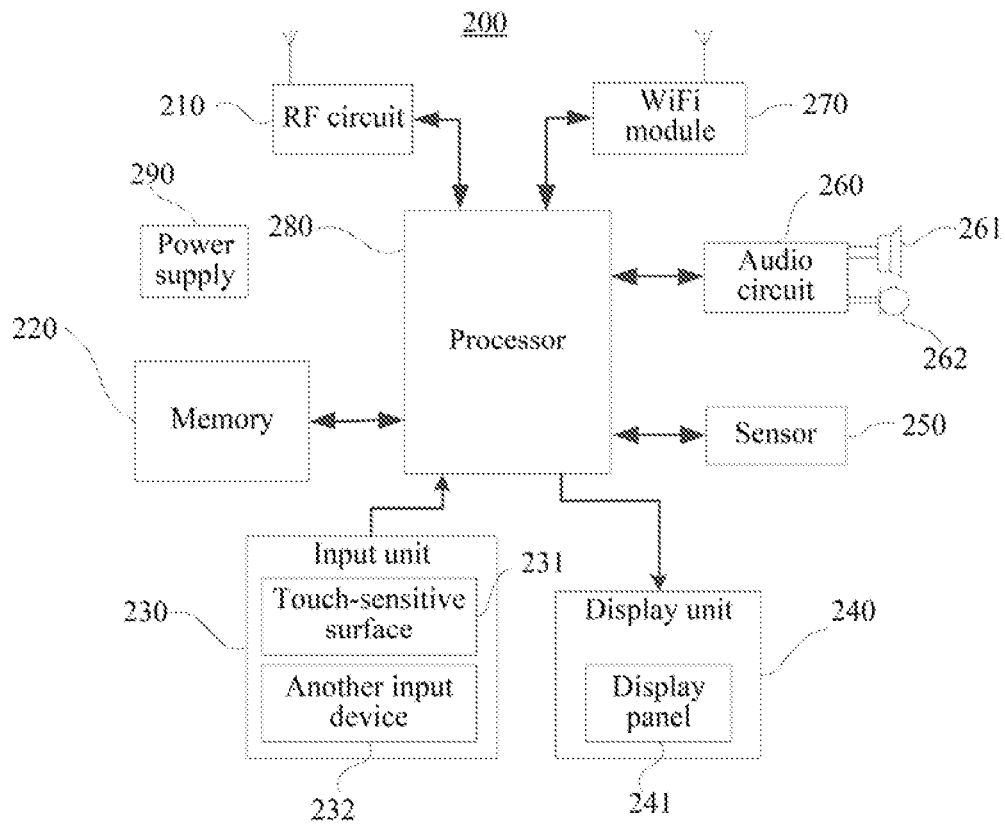
FIG. 2 is a schematic structural diagram of a control device or a collision judgment device according to an embodiment of the present disclosure.

FIG. 2 shows a schematic structural diagram of a control device or a collision judgment device according to an embodiment of the present disclosure. The control device may be the control device 120 in FIG. 1, and the collision judgment device may be the collision judgment device 130 in FIG. 1. Specifically:

A device 200 may include components such as a radio frequency (RF) circuit 210, a memory 220 including one or more computer readable storage media, an input unit 230, a display unit 240, a sensor 250, an audio circuit 260, a short-range wireless communications module 270, a processor 280 including one or more processing cores, and a power supply 290. A person skilled in the art may understand that the structure of the control device shown in FIG. 2 does not constitute a limitation to the control device, and the control device may include more components or fewer components than those shown in the figure, or some components may be combined, or a different component deployment may be used.

The RF circuit 210 may be configured to receive and send signals during an information receiving and sending process or a call process. Particularly, the RF circuit receives downlink information from a base station, then delivers the downlink information to one or more processors 280 for processing, and sends related uplink data to the base station. Generally, the RF circuit 210 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 210 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 220 may be configured to store a software program and module. The processor 280 runs the software program and module stored in the memory 220, to implement various functional applications and data processing. The memory 220 may mainly include a program storage area and a data storage area. The program storage area may store an operating system, an application program required by at least one function (such as a sound playback function and an image display function), and the like. The data storage area may store data (such as audio data and an address book) created according to use of the device 200, and the like. In addition, the memory 220 may include a high speed random access memory, and may also include a non-volatile memory, such as at least one magnetic disk storage device, a flash memory, or another volatile solid-state storage device. Correspondingly, the memory 220 may further include a memory controller, so as to provide access of the processor 280 and the input unit 230 to the memory 220. Although FIG. 2 shows the RF circuit 210, it may be understood that the wireless communications unit is not a necessary component of the device 200, and when required, the wireless communications unit may be omitted as long as the scope of the essence of the present disclosure is not changed.

The input unit 230 may be configured to receive input digit or character information, and generate a keyboard, mouse, joystick, optical, or track ball signal input related to the user setting and function control. Specifically, the input unit 230 may include a touch-sensitive surface 231 and another input device 232. The touch-sensitive surface 231, which may also be referred to as a touch-screen or a touch panel, may collect a touch operation of a user on or near the touch-sensitive surface (such as an operation of a user on or near the touch-sensitive surface 231 by using any suitable object or accessory, such as a finger or a stylus), and drive a corresponding connection apparatus according to a preset program. Optionally, the touch-sensitive surface 231 may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch information into touch point coordinates, and sends the touch point coordinates to the processor 280. Moreover, the touch controller can receive and execute a command sent from the processor 280. In addition, the touch-sensitive surface 231 may be a resistive, capacitive, infrared, or surface sound wave type touch-sensitive surface. In addition to the touch-sensitive surface 231, the input unit 230 may further include the another input device 232. Specifically, the another input device 232 may include, but is not limited to, one or more of a physical keyboard, a functional key (such as a volume control key or a switch key), a track ball, a mouse, and a joystick.

The display unit 240 may be configured to display information input by the user or information provided for the user, and various graphical user interfaces of the device 200. The graphical user interfaces may be formed by a graph, a text, an icon, a video, or any combination thereof. The display unit 240 may include a display panel 241. Optionally, the display panel 241 may be configured by using a liquid crystal display (LCD), an organic light-emitting diode (OLED), or the like. Further, the touch panel 231 may cover the display panel 241. After detecting a touch operation on or near the touch-sensitive surface 231, the touch-sensitive surface 231 transfers the touch operation to the processor 280, so as to determine the type of the touch event. Then, the processor 280 provides a corresponding visual output on the display panel 241 according to the type of the touch event. Although, in FIG. 2, the touch-sensitive surface 231 and the display panel 241 are used as two separate parts to implement input and output functions, in some embodiments, the touch-sensitive surface 231 and the display panel 241 may be integrated to implement the input and output functions.

The device 200 may further include at least one sensor 250, such as an optical sensor, a motion sensor, and other sensors. Specifically, the optical sensor may include an ambient light sensor and a proximity sensor. The ambient light sensor may adjust luminance of the display panel 241 according to brightness of the ambient light. The proximity sensor may switch off the display panel 241 and/or backlight when the device 200 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the device 200, are not further described herein.

The audio circuit 260, a loudspeaker 221, and a microphone 222 may provide audio interfaces between the user and the device 200. The audio circuit 260 may convert received audio data into an electric signal and transmit the electric signal to the loudspeaker 221. The loudspeaker 221 converts the electric signal into a sound signal for output. On the other hand, the microphone 222 converts a collected sound signal into an electric signal. The audio circuit 260 receives the electric signal and converts the electric signal into audio data, and outputs the audio data to the processor 280 for processing. Then, the processor 280 sends the audio data to, for example, another control device by using the RF circuit 210, or outputs the audio data to the memory 220 for further processing. The audio circuit 260 may further include an earplug jack, so as to provide communication between a peripheral earphone and the device 200.

The short-range wireless communications module 270 may be a wireless fidelity (WiFi) module, a Bluetooth module, a infrared module, or the like. The device 200 may transmit, by using the short-range wireless communications module 270, information to a wireless transmission module that is set in a moving device.

The processor 280 is a control center of the device 200, is connected to various parts of the entire control device by using various interfaces and lines, and by running or executing a software program and/or module stored in the memory 220, perform various functions of the device 200 and process data, so as to perform overall monitoring on the control device. Optionally, the processor 280 may include one or more processing cores. Optionally, the processor 280 may integrate an application processor and a modem. The application processor mainly processes an operating system, a user interface, an application program, and the like. The modem mainly processes wireless communication. It may be understood that the foregoing modem may also not be integrated into the processor 280.

The device 200 further includes the power supply 290 (such as a battery) for supplying power to the components. Preferably, the power supply may be logically connected to the processor 280 by using a power management system, thereby implementing functions such as charging, discharging and power consumption management by using the power management system. The power supply 290 may further include one or more of a direct current or alternating current power supply, a re-charging system, a power failure detection circuit, a power supply converter or inverter, a power supply state indicator, and any other components.

Although not shown in the figure, the device 200 may further include a camera, a Bluetooth module, and the like, which are not further described herein.

The device 200 further includes a memory and one or more programs. The one or more programs are stored in the memory and configured to be executed by one or more processors.

Figure 3:
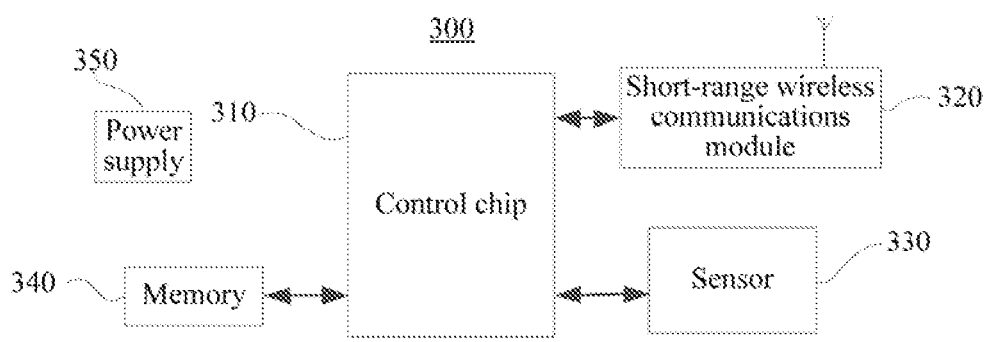
FIG. 3 is a schematic structural diagram of a moving device according to an embodiment of the present disclosure.

FIG. 3 shows a schematic structural diagram of a moving device according to an embodiment of the present disclosure. The moving device may be the moving device 110 in FIG. 1. Specifically:

The moving device 300 includes a control chip 310, a short-range wireless communications module 320, a sensor 330, a memory 340, and a power supply 350. The short-range wireless communications module 320 may be a wireless fidelity (WiFi) module, a Bluetooth module, a infrared module, or the like. The moving device 300 may transmit, by using the short-range wireless communications module 320, collision information to a wireless transmission module that is correspondingly set in a control device.

The moving device 300 includes at least one sensor 330. Specifically, the sensor 330 includes an acceleration sensor, and the acceleration sensor is configured to collect magnitude of accelerations in various directions (generally on three axes) in a movement process. In another possible implementation, the sensor 330 may further include an angular velocity sensor, and the angular velocity sensor is configured to collect angular velocity data that is of a moving moving device and that is in a movement process.

Control pins of the control chip 310 are respectively connected to the short-range wireless communications module 320 and the sensor 330.

A storage medium used for the memory 340 includes a RAM, a ROM, an EPROM, an EEPROM, a flash memory, or another solid-state storage technology, CD-ROM, DVD, or another optical storage, a cassette, a magnetic tape, a disk storage or another magnetic storage device, or the like. The memory 340 stores one or more programs, the programs are configured to be executed by the control chip 310.

The moving device 300 further includes the power supply 350 (such as a battery) for supplying power to the components. Preferably, the power supply 350 may be logically connected to the control chip 310 by using a power management system, thereby implementing functions such as charging, discharging and power consumption management by using the power management system. The power supply 350 may further include one or more of a direct current or alternating current power supply, a re-charging system, a power failure detection circuit, a power supply converter or inverter, a power supply state indicator, and any other components.

It should be noted that, the moving device 300 may further include a multimedia component, a driver component, and the like. This embodiment merely provides a schematic description while using an example in which the moving device 300 includes the foregoing components, and does not constitute a limitation on the present disclosure.

To provide more detailed descriptions about the embodiments of the present disclosure, the following describes, by using method embodiments, an operating principle of the collision judgment system provided in the embodiments of the present disclosure.

Figure 4:
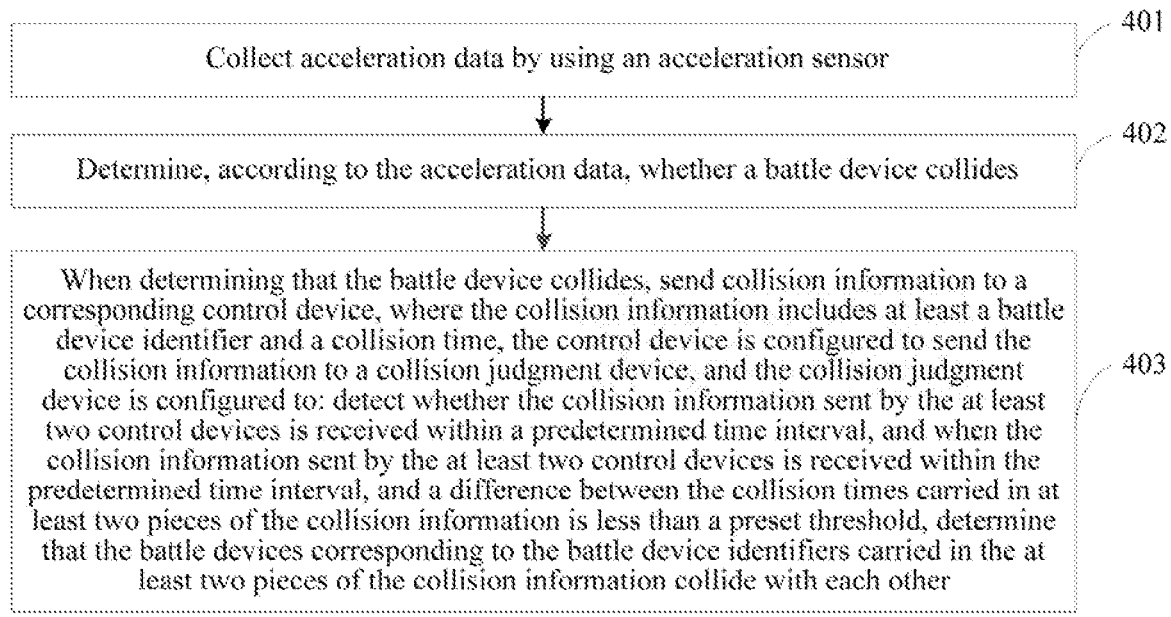
FIG. 4 is a flowchart of a collision judgment method according to an embodiment of the present disclosure.

Referring to FIG. 4, FIG. 4 is a flowchart of a collision judgment method according to an embodiment of the present disclosure. This embodiment provides descriptions by using an example in which the collision judgment method is applied to the moving device 110 shown in FIG. 1. The method includes the following steps.

Step 401: Collect acceleration data by using an acceleration sensor.

The acceleration sensor is set in the moving device, and the acceleration sensor collects the acceleration data that is in a movement process of the moving device.

Step 402: Determine, according to the acceleration data, whether a moving device collides.

Step 403: When determining that the moving device collides, send collision information to a corresponding control device, where the collision information includes at least a moving device identifier and a collision time, the control device is configured to send the collision information to a collision judgment device, and the collision judgment device is configured to: detect whether the collision information sent by the at least two control devices is received within a predetermined time interval, and when the collision information sent by the at least two control devices is received within the predetermined time interval, and a difference between the collision times carried in at least two pieces of the collision information is less than a preset threshold, determine that the moving devices corresponding to the moving device identifiers carried in the at least two pieces of the collision information collide with each other.

In summary, according to the collision judgment method provided in this embodiment, a moving device determines, according to acceleration data collected by an acceleration sensor, whether collision happens. When it is determined that the collision happens, a control device sends collision information to a collision judgment device. When the collision judgment device receives at least two pieces of collision information within a predetermined time interval and collision times carried in the collision information are close to each other, the collision judgment device determines that the at least two moving devices collide with each other. In this way, a problem that in a related technology, a moving device can only determine whether collision happens but cannot determine a collision object type, and a relatively large collision detection blind area exists. Effects are achieved, and the effects are: a collision judgment device can determine, according to collision times sent by moving devices, collision happening between the moving devices, a collision detection blind area does not exist, and collision judgment accuracy is increased.

Figure 5:
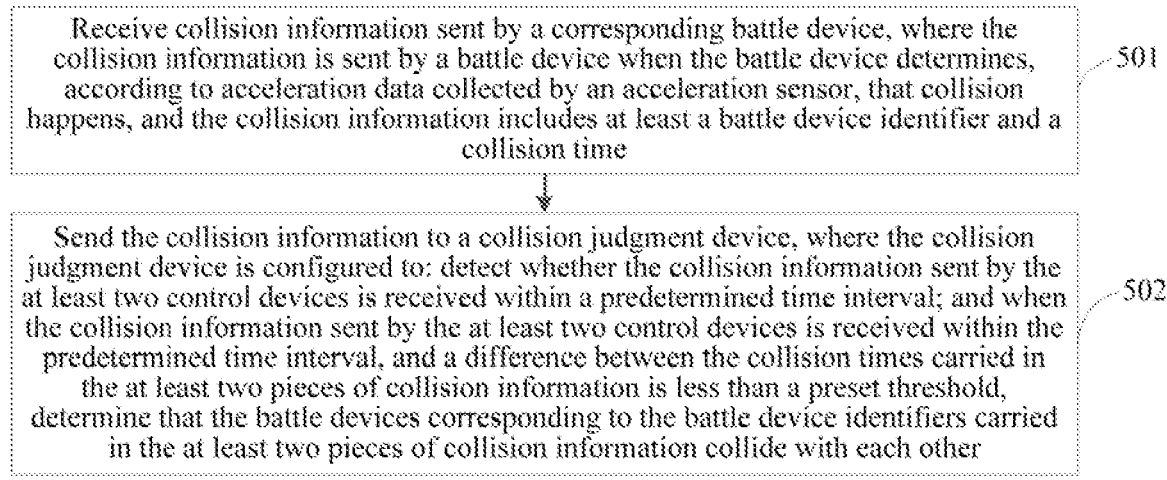
FIG. 5 is a flowchart of a collision judgment method according to another embodiment of the present disclosure.

Referring to FIG. 5, FIG. 5 is a flowchart of a collision judgment method according to another embodiment of the present disclosure. This embodiment provides descriptions by using an example in which the collision judgment method is applied to the control device 120 shown in FIG. 1. The method includes the following steps:

Step 501: Receive collision information sent by a corresponding moving device, where the collision information is sent by a moving device when the moving device determines, according to acceleration data collected by an acceleration sensor, that collision happens, and the collision information includes at least a moving device identifier and a collision time.

Step 502: Send the collision information to a collision judgment device, where the collision judgment device is configured to: detect whether the collision information sent by the at least two control devices is received within a predetermined time interval; and when the collision information sent by the at least two control devices is received within the predetermined time interval, and a difference between the collision times carried in the at least two pieces of collision information is less than a preset threshold, determine that the moving devices corresponding to the moving device identifiers carried in the at least two pieces of collision information collide with each other.

In summary, according to the collision judgment method provided in this embodiment, a moving device determines, according to acceleration data collected by an acceleration sensor, whether collision happens. When it is determined that the collision happens, a control device sends collision information to a collision judgment device. When the collision judgment device receives at least two pieces of collision information within a predetermined time interval and collision times carried in the collision information are close to each other, the collision judgment device determines that the at least two moving devices collide with each other. In this way, a problem that in a related technology, a moving device can only determine whether collision happens but cannot determine a collision object type, and a relatively large collision detection blind area exists. Effects are achieved, and the effects are: a collision judgment device can determine, according to collision times sent by moving devices, collision happening between the moving devices, a collision detection blind area does not exist, and collision judgment accuracy is increased.

Figure 6:
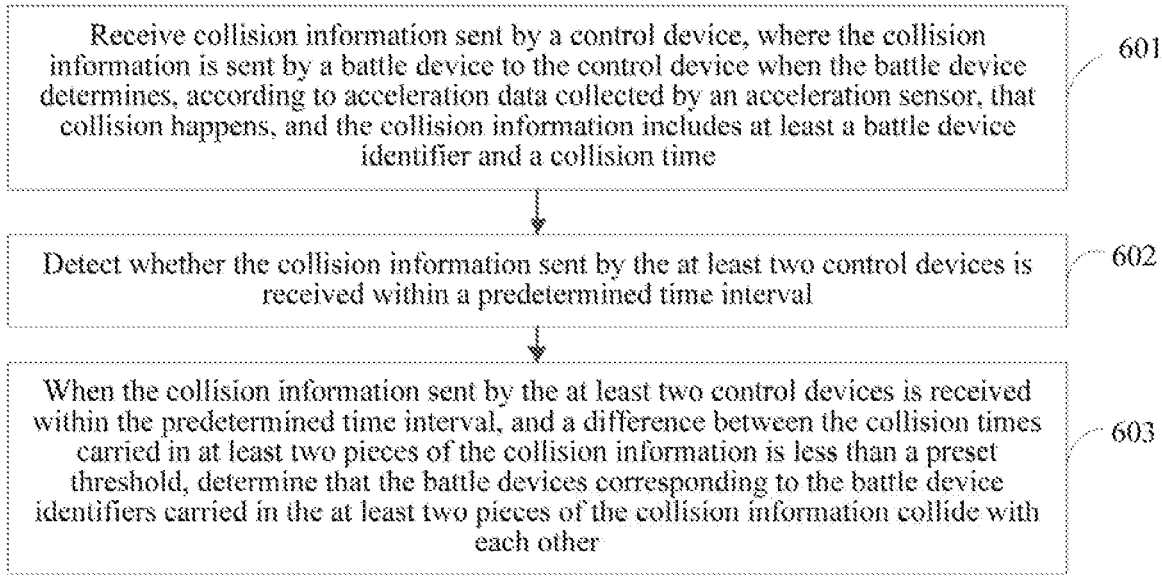
FIG. 6 is a flowchart of a collision judgment method according to still another embodiment of the present disclosure.

Referring to FIG. 6, FIG. 6 is a flowchart of a collision judgment method according to still another embodiment of the present disclosure. This embodiment provides descriptions by using an example in which the collision judgment method is applied to the collision judgment device 130 shown in FIG. 1. The method includes the following steps:

Step 601: Receive collision information sent by a control device, where the collision information is sent by a moving device to the control device when the moving device determines, according to acceleration data collected by an acceleration sensor, that collision happens, and the collision information includes at least a moving device identifier and a collision time.

Step 602: Detect whether the collision information sent by the at least two control devices is received within a predetermined time interval.

Step 603: When the collision information sent by the at least two control devices is received within the predetermined time interval, and a difference between the collision times carried in at least two pieces of the collision information is less than a preset threshold, determine that the moving devices corresponding to the moving device identifiers carried in the at least two pieces of the collision information collide with each other.

In summary, according to the collision judgment method provided in this embodiment, a moving device determines, according to acceleration data collected by an acceleration sensor, whether collision happens. When it is determined that the collision happens, a control device sends collision information to a collision judgment device. When the collision judgment device receives at least two pieces of collision information within a predetermined time interval and collision times carried in the collision information are close to each other, the collision judgment device determines that the at least two moving devices collide with each other. In this way, a problem that in a related technology, a moving device can only determine whether collision happens but cannot determine a collision object type, and a relatively large collision detection blind area exists. Effects are achieved, and the effects are: a collision judgment device can determine, according to collision times sent by moving devices, collision happening between the moving devices, a collision detection blind area does not exist, and collision judgment accuracy is increased.

Figure 7A:
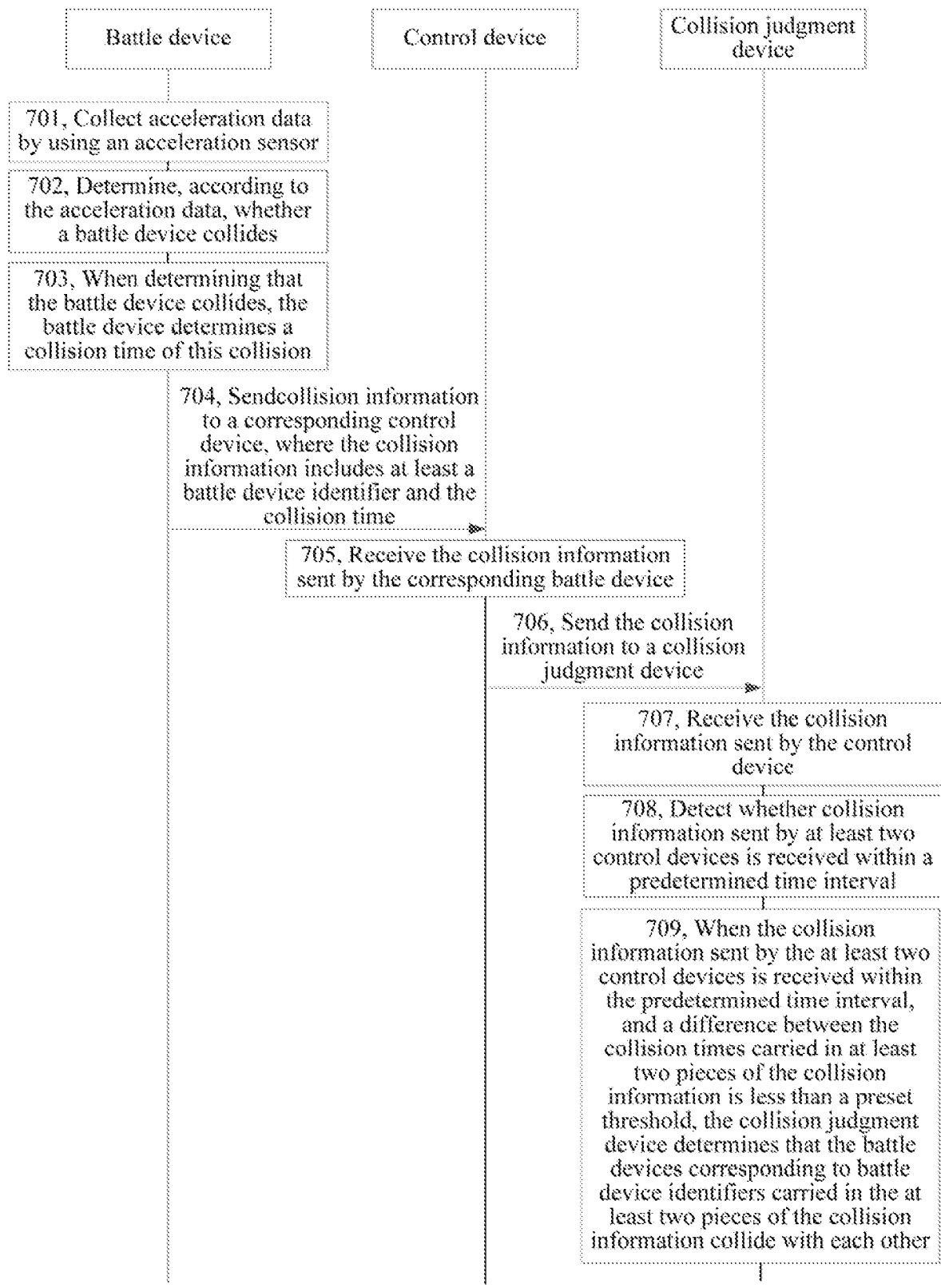
FIG. 7A is a flowchart of a collision judgment method according to yet another embodiment of the present disclosure.

Referring to FIG. 7A, FIG. 7A is a flowchart of a collision judgment method according to yet another embodiment of the present disclosure. This embodiment provides descriptions by using an example in which the collision judgment method is applied to the implementation environment shown in FIG. 1. The method includes the following steps.

Step 701: A moving device collects acceleration data by using an acceleration sensor.

In a battle process, a moving device collects acceleration data that is in a movement process in real time by using a built-in acceleration sensor.

Step 702: The moving device determines, according to the acceleration data, whether a moving device collides.

The acceleration data includes a first acceleration and a second acceleration. A direction of the first acceleration is a forward direction of the moving device, and a direction of the second acceleration is perpendicular to the direction of the first acceleration.

Figure 7B:
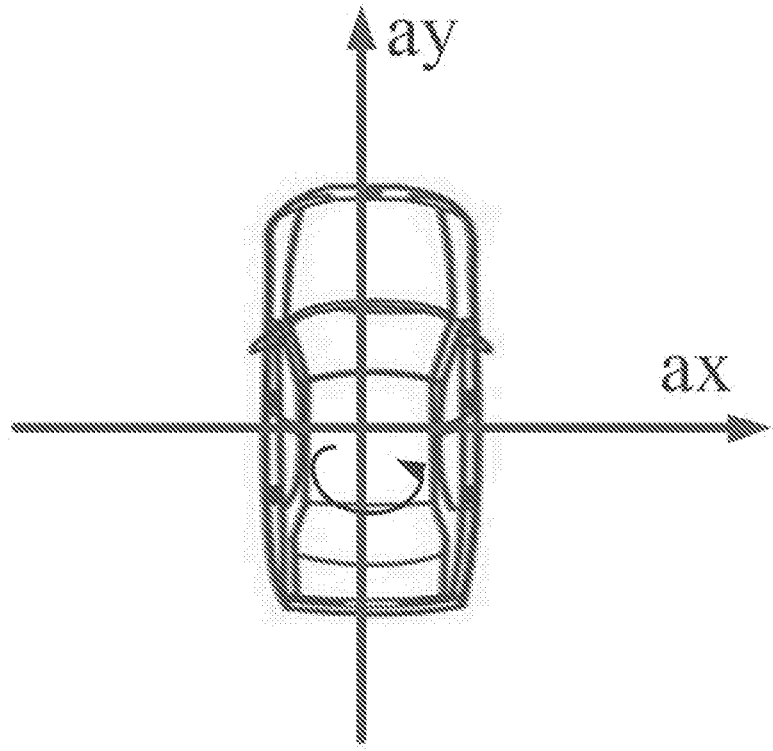
FIG. 7B is a schematic structural diagram of a first acceleration and a second acceleration according to an embodiment of the present disclosure.

As shown in FIG. 7B, using an example in which the moving device is an intelligent battle toy car, a positive direction of the first acceleration (ay) is the car tail pointing to the car head (the forward direction of the moving device), and a positive direction of the second acceleration (ax) is the left side of the car body pointing to the right side of the car body. For convenience of description, all of the following embodiments provide descriptions by using an example in which the positive direction of the first acceleration and the positive direction of the second acceleration that are shown in FIG. 7B, and do not constitute a limitation on the present disclosure.

When the moving device collides, peak values appear in the first acceleration and the second acceleration, and the moving device may detect whether the collected first acceleration and/or second acceleration reaches the peak value, to further determine whether the moving device collides.

Figure 7C:
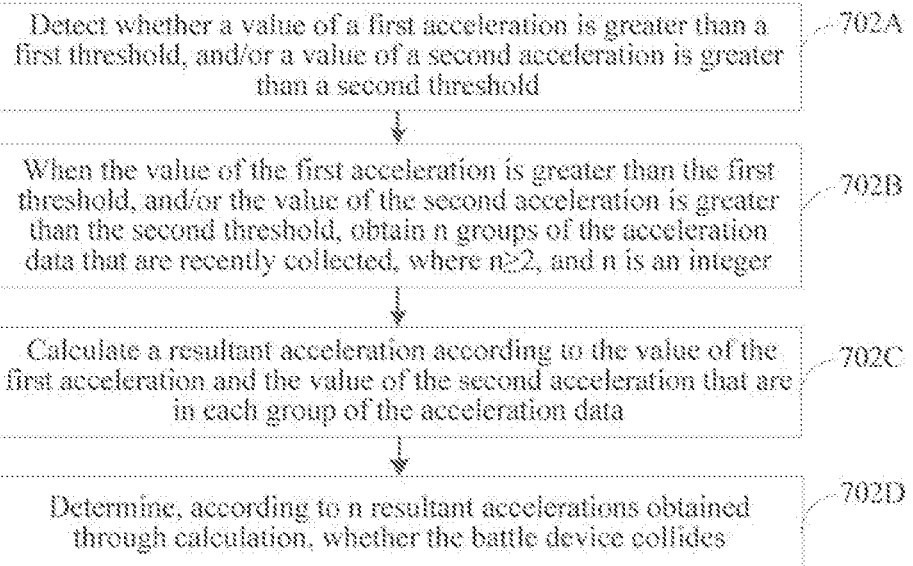
FIG. 7C is a flowchart of a process of determining whether a moving device collides according to the collision judgment method provided in FIG. 7A.

As a possible implementation, as shown in FIG. 7C, step 702 may include the following substeps. The steps may include: when at least one of a value of the first acceleration being greater than a first threshold or a value of the second acceleration being greater than a second threshold occurs, obtaining, by the moving device, n groups of the acceleration data that are recently collected, wherein n≥2, and n is an integer; calculating, by the moving device, a resultant acceleration according to the value of the first acceleration and the value of the second acceleration in each of the n groups of the acceleration data to obtain n resultant accelerations; determining, by the moving device, according to the n resultant accelerations, whether the moving device collides; and when the moving device determines that the moving device collides, determining the collision time as a time when the value of the first acceleration is detected to be greater than the first threshold or the value of the second acceleration is detected to be greater than the second threshold.

Specifically, Step 702A: The moving device detects whether a value of a first acceleration is greater than a first threshold, and/or a value of a second acceleration is greater than a second threshold.

When the moving device collides in the battle process, regardless of active collision or passive collision, the value of the first acceleration and/or the value of the second acceleration suddenly increases. The moving device detects in real time whether the value of the first acceleration is greater than the first threshold, and/or the value of the second acceleration is greater than the second threshold. The first threshold and the second threshold may be the same, or may be different. For example, both the first threshold and the second threshold may be 3 g, that is, the moving device detects whether the values of the first acceleration and the second acceleration are three times the gravity acceleration.

Step 702B: When the value of the first acceleration is greater than the first threshold, and/or the value of the second acceleration is greater than the second threshold, the moving device obtains n groups of the acceleration data that are recently collected, where n≥2, and n is an integer.

In some cases, the first acceleration and the second acceleration of the moving device also suddenly increase. For example, when the moving device accelerates or decelerates, the value of the first acceleration also suddenly increases, and when the moving device slides, the value of the second acceleration also suddenly increases. To prevent misjudgment, when detecting that the value of the first acceleration is greater than the first threshold and/or the value of the second acceleration is greater than the second threshold, the moving device needs to obtain n groups of acceleration data that are recently collected, and further determine, according to the acceleration data, whether the moving device collides. The n groups of the acceleration data is data collected by the acceleration sensor after it is detected that the value of the first acceleration or the second acceleration is greater than the threshold.

Step 702C: The moving device calculates a resultant acceleration according to the value of the first acceleration and the value of the second acceleration that are in each group of the acceleration data.

The moving device obtains the resultant acceleration that is in a direction of a force through calculation according to the value of the first acceleration and the value of the second acceleration. The resultant acceleration 2=the first acceleration 2+the second acceleration 2. For example, in a group of acceleration data, the first acceleration is 30 m/s$^2$, the second acceleration is 10 m/s$^2$, and then a resultant acceleration corresponding to the group of the acceleration data is 31.62 m/s$^2$.

By repeating the foregoing steps, n resultant accelerations corresponding to the n groups of the acceleration data may be obtained.

Step 702D: The moving device determines, according to n resultant accelerations obtained through calculation, whether the moving device collides.

When the moving device collides, a change status of the resultant acceleration is that the resultant acceleration quickly reaches a peak value of the resultant acceleration, and then quickly attenuates, and the change trend is similar to a sharply rising wave crest. According to this change status, the moving device may detect whether resultant accelerations at recent n time points satisfy the foregoing change trend, thereby determining whether the moving device has collided. In a possible implementation, the moving device may store the n groups of the acceleration data in a form of a sliding window, obtain four consecutive groups of acceleration data in a manner of sliding backward one group of acceleration data each time, and obtain a corresponding $i^{th}$ resultant acceleration, $i+1^{th}$ resultant acceleration, $i+2^{th}$ resultant acceleration, and $i+3^{th}$ resultant acceleration, where i≥1, and i is an integer. A collect time of acceleration data corresponding to the $i^{th}$ resultant acceleration<a collect time of acceleration data corresponding to the $i+1^{th}$ resultant acceleration<a collect time of acceleration data corresponding to the $i+2^{th}$ resultant acceleration<a collect time of acceleration data corresponding to the $i+3^{th}$ resultant acceleration. The n groups of the acceleration data that are stored in the moving device may be shown in Table 1.

TABLE 1

| ay | ay[1] | ay[2] | ... | ay[i] | ay[i + 1] | ay[i + 2] | ay[i + 3] | ... | ay[n − 1] | ay[n] |
| ax | ax[1] | ax[2] | ... | ax[i] | ax[i + 1] | ax[i + 2] | ax[i + 3] | ... | ax[n − 1] | ax[n] | ay indicates the first acceleration, and ax indicates the second acceleration.

That the moving device determines, according to four consecutive resultant accelerations, whether the moving device collides may include the following steps.

1. Calculate a difference between the $i^{th}$ resultant acceleration and the $i+2^{th}$ resultant acceleration to obtain a first slope.

The moving device calculates the difference between the $i^{th}$ resultant acceleration and the $i+2^{th}$ resultant acceleration to obtain the first slope that is used to indicate a change trend between the $i^{th}$ resultant acceleration and the $i+2^{th}$ resultant acceleration.

2. Calculate a difference between the $i+1^{th}$ resultant acceleration and the $i+3^{th}$ resultant acceleration to obtain a second slope.

The moving device calculates the difference between the $i+1^{th}$ resultant acceleration and the $i+3^{th}$ resultant acceleration to obtain the second slope that is used to indicate a change trend between the $i+1^{th}$ resultant acceleration and the $i+3^{th}$ resultant acceleration.

3. When one is a positive number and the other is a negative number among the first slope and the second slope, and a difference between the first slope and the second slope is greater than a third threshold, determine that the moving device collides. In other words, when one of the first slope and the second slope is a positive number and the other of the first slope and the second slope is a negative number, and when a difference between the first slope and the second slope is greater than a third threshold, the moving device determines it collides.

If the moving device collides, the difference between the $i^{th}$ resultant acceleration and the $i+2^{th}$ resultant acceleration should be negative, and the difference between the $i+1^{th}$ resultant acceleration and the $i+3^{th}$ resultant acceleration is positive, that is, one is a positive number and the other is a negative number among the first slope and the second slope (change trends of the two are opposite to each other). To exclude a case in which shaking or slight friction happens, and further increase collision judgment accuracy, the moving device needs further to calculate the difference between the first slope and the second slope, and estimate a peak value point of the resultant acceleration according to the difference. In a possible implementation, when the difference between the first slope and the second slope is greater than a third threshold, the moving device determines that the peak value point of the resultant acceleration is higher than a preset peak value point, thereby excluding the case in which shaking or slight friction happens, and determining that the moving device collides.

Step 703: When determining that the moving device collides, the moving device determines a collision time of this collision.

A frequency at which the acceleration sensor collects acceleration data is very high (4000 Hz), a time when the moving device actually collides is very close to a time when the moving device detects that the value of the first acceleration is greater than the first threshold or the value of the second acceleration is greater than the second threshold. In a possible implementation, when determining that the moving device collides, the moving device determines, as the collision time, a time when it is detected that the value of the first acceleration is greater than the first threshold or the value of the second acceleration is greater than the second threshold.

Step 704: The moving device sends collision information to a corresponding control device, where the collision information includes at least a moving device identifier and the collision time.

By using the foregoing steps, the moving device may determine that collision has happened, but cannot determine whether a collision object is another moving device or an obstacle. To further determine the collision object, the moving device sends the collision information carrying the moving device identifier and the collision time to the control device, and the control device forwards the collision information to the collision judgment device.

Step 705: The control device receives the collision information sent by the corresponding moving device.

Step 706: The control device sends the collision information to a collision judgment device.

The control device sends the collision information to the collision judgment device by using a connection established between the control device and the collision judgment device. It should be noted that, when the control device is the collision judgment device, after the control device receives the collision information, the control device does not need to perform this step. This embodiment provides descriptions by using an example in which the control device and the collision judgment device are not a same device, and does not constitute a limitation on the present disclosure.

Step 707: The collision judgment device receives the collision information sent by the control device.

Correspondingly, the collision judgment device receives collision information sent by control devices in a system.

Step 708: The collision judgment device detects whether collision information sent by at least two control devices is received within a predetermined time interval.

When a moving device collides with another moving device, the colliding moving device immediately send collision information to the collision judgment device by using control devices, and the collision judgment device receives, nearly at the same moment, the collision information sent by the two control devices. When the moving device collides with an obstacle, the collision judgment device receives only collision information sent by a single control device. Considering a delay of collision information transmission, the collision judgment device detects whether the collision information sent by the at least two control devices is received within the predetermined time interval. When the collision information sent by the at least two control devices is received within the predetermined time interval, step 709 is performed. When the collision information sent by the at least two control devices is not received within the predetermined time interval, it is determined that the moving device collides with an obstacle.

For example, the predetermined time interval may be 500 ms, that is, after receiving collision information sent by a control device, the collision judgment device detects whether collision information sent by another control device is received within 500 ms.

Step 709: When the collision information sent by the at least two control devices is received within the predetermined time interval, and a difference between the collision times carried in at least two pieces of the collision information is less than a preset threshold, the collision judgment device determines that the moving devices corresponding to at least two moving device identifiers collide with each other.

There is a case in which two moving devices successively collide with an obstacle, and send collision information. In this case, the collision judgment device may receive, with the predetermined time interval, collision information sent by the two control devices (however, there is a large difference between collision times carried in the collision information). To prevent misjudgment, when receiving, within the predetermined time interval, the collision information sent by the at least two control devices, the collision judgment device needs further to detect whether a difference between collision times carried in the collision information is less than a preset threshold, and when the difference between the collision times is less than the preset threshold, determine that the moving devices collide with each other.

It should be noted that, after determining that the at least two moving devices collide with each other, the collision judgment device may further sends a feedback instruction to the corresponding moving devices by using the control devices, to instruct the moving devices to make play effective, light up a flashing light, or perform an action such as rolling-over to a side.

In summary, according to the collision judgment method provided in this embodiment, a moving device determines, according to acceleration data collected by an acceleration sensor, whether collision happens. When it is determined that the collision happens, a control device sends collision information to a collision judgment device. When the collision judgment device receives at least two pieces of collision information within a predetermined time interval and collision times carried in the collision information are close to each other, the collision judgment device determines that the at least two moving devices collide with each other. In this way, a problem that in a related technology, a moving device can only determine whether collision happens but cannot determine a collision object type, and a relatively large collision detection blind area exists. Effects are achieved, and the effects are: a collision judgment device can determine, according to collision times sent by moving devices, collision happening between the moving devices, a collision detection blind area does not exist, and collision judgment accuracy is increased.

To enable the collision judgment device to determine whether collision of a moving device is active collision or passive collision, and send statuses of the active collision or passive collision to a control device, the control device sends a corresponding control instruction to the moving device, to instruct the moving device to perform a corresponding operation, the moving device further determines a collision type of the moving device according to collected acceleration data, adds the determined collision type to collision information, and sends the collision information together with the collision type to the collision judgment device, and then the collision judgment device determines the statuses of the active collision or passive collision of the moving device according to the collision type.

Figure 7D:
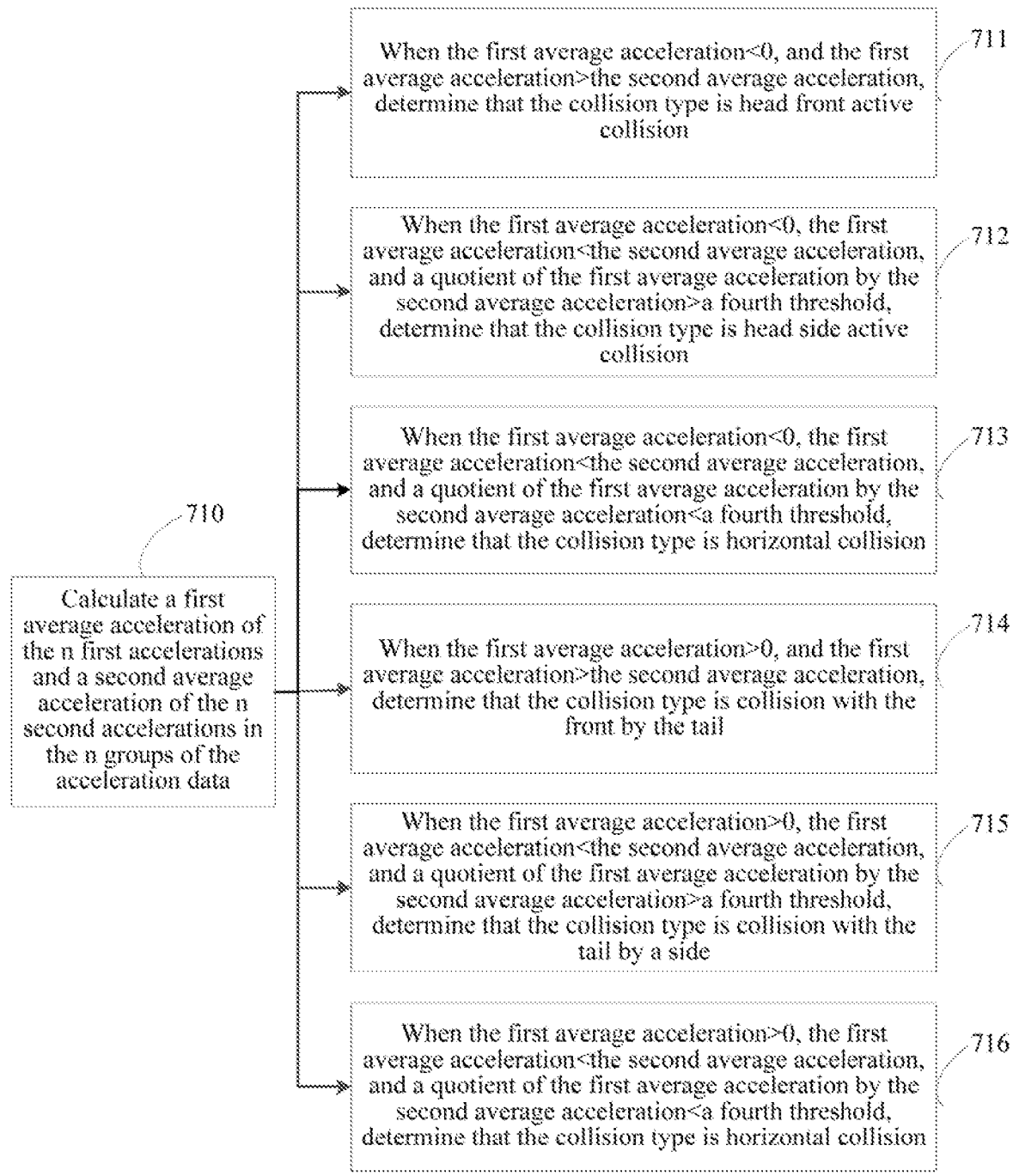
FIG. 7D and FIG. 7F are a flowchart of a collision type determining process according to the collision judgment method provided in FIG. 7A.

In a possible implementation, as shown in FIG. 7D, before step 704, the method may further include the following steps.

Step 710: The moving device calculates a first average acceleration of the n first accelerations and a second average acceleration of the n second accelerations in the n groups of the acceleration data.

After determining the moving device collides, the moving device obtains the first average acceleration through calculation according to the n first accelerations in the n groups of the acceleration data, and obtains the second average acceleration through calculation according to the n second accelerations in the n groups of the acceleration data.

Step 711: When the first average acceleration<0, and the first average acceleration>the second average acceleration, the moving device determines that the collision type is head front active collision.

Figure 7E:
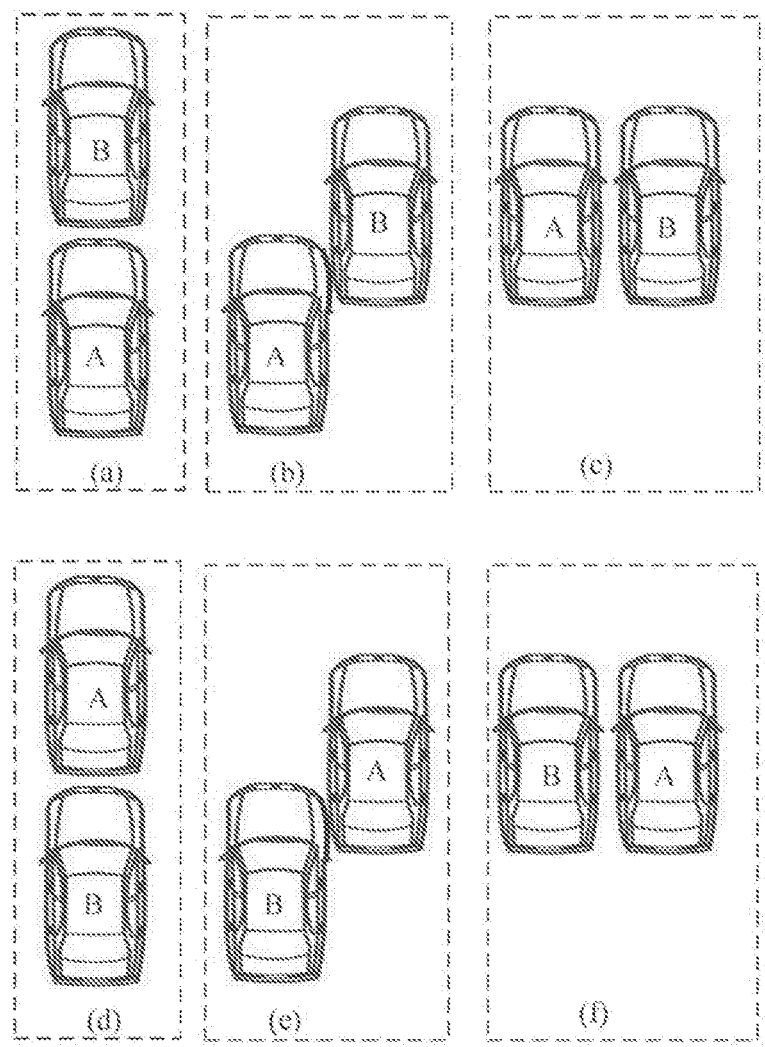
FIG. 7E is a schematic diagram of implementation of the collision judgment method provided in FIG. 7A.

As shown in FIG. 7E(a), when the moving device A uses the head to squarely collide with the tail of the moving device B from behind, in a process of the collision, a direction of the first average acceleration is the head pointing to the tail (the first average acceleration<0), and for a force produced during the collision, a component in a direction of the first acceleration is far greater than a component in a direction of the second acceleration (a value of the first average acceleration>a value of the second average acceleration).

Therefore, when the first average acceleration<0, and the first average acceleration>the second average acceleration, the moving device determines that the collision type is head front active collision.

Step 712: When the first average acceleration<0, the first average acceleration<the second average acceleration, and a quotient of the first average acceleration by the second average acceleration>a fourth threshold, the moving device determines that the collision type is head side active collision.

As shown in FIG. 7E(b), when the moving device A uses a side of the head to collide with a side of the tail of the moving device B from a side, in a process of the collision, a direction of the first average acceleration is the head pointing to the tail (the first average acceleration<0), and for a force produced during the collision, a component in a direction of the first acceleration is slightly less than a component in a direction of the second acceleration (a value of the first average acceleration<a value of the second average acceleration, and the value of the first average acceleration is relatively close to the value of the second average acceleration).

Therefore, when the first average acceleration<0, the first average acceleration<the second average acceleration, and a quotient of the first average acceleration by the second average acceleration>a fourth threshold, the moving device determines that the collision type is head side active collision. The fourth threshold may be a number greater than 0.4 and less than 1.

Step 713: When the first average acceleration<0, the first average acceleration<the second average acceleration, and a quotient of the first average acceleration by the second average acceleration<a fourth threshold, the moving device determines that the collision type is horizontal collision.

As shown in FIG. 7E(c), when the moving device A uses a side of the car body to collide with the moving device B from a side, in a process of the collision, a direction of the first average acceleration is the head pointing to the tail (the first average acceleration<0), and for a force produced during the collision, a component in a direction of the first acceleration is far less than a component in a direction of the second acceleration (a value of the first average acceleration<a value of the second average acceleration, and there is a large difference between the value of the first average acceleration and the value of the second average acceleration).

Therefore, when the first average acceleration<0, the first average acceleration<the second average acceleration, and a quotient of the first average acceleration by the second average acceleration<a fourth threshold, the moving device determines that the collision type is horizontal collision.

Step 714: When the first average acceleration>0, and the first average acceleration>the second average acceleration, the moving device determines that the collision type is collision with the front by the tail.

Contrary to collision by a moving device with another moving device, as shown in FIG. 7E(d), when the tail of the moving device A is squarely collided with by the moving device B by using the head from behind, in a process of the collision, a direction of the first average acceleration is the tail pointing to the head (the first average acceleration>0), and for a force produced during the collision, a component in a direction of the first acceleration is far greater than a component in a direction of the second acceleration (a value of the first average acceleration>a value of the second average acceleration).

Therefore, when the first average acceleration>0, and the first average acceleration>the second average acceleration, the moving device determines that the collision type is collision with the front by the tail.

Step 715: When the first average acceleration>0, the first average acceleration<the second average acceleration, and a quotient of the first average acceleration by the second average acceleration>a fourth threshold, the moving device determines that the collision type is collision with the tail by a side.

As shown in FIG. 7E(e), when a side of the tail of the moving device A is collided with by the moving device B by using a side of the head from a side, in a process of the collision, a direction of the first average acceleration is the tail pointing to the head (the first average acceleration>0), and for a force produced during the collision, a component in a direction of the first acceleration is slightly less than a component in a direction of the second acceleration (a value of the first average acceleration<a value of the second average acceleration, and the value of the first average acceleration is relatively close to the value of the second average acceleration).

Therefore, when the first average acceleration>0, the first average acceleration<the second average acceleration, and a quotient of the first average acceleration by the second average acceleration>a fourth threshold, the moving device determines that the collision type is collision with the tail by a side.

Step 716: When the first average acceleration>0, the first average acceleration<the second average acceleration, and a quotient of the first average acceleration by the second average acceleration<a fourth threshold, the moving device determines that the collision type is horizontal collision.

As shown in FIG. 7E(c), when the moving device A is collided with by the moving device B by using a side of the car body from a side, in a process of the collision, a direction of the first average acceleration is the tail pointing to the head (the first average acceleration>0), and for a force produced during the collision, a component in a direction of the first acceleration is far less than a component in a direction of the second acceleration (a value of the first average acceleration<a value of the second average acceleration, and there is a large difference between the value of the first average acceleration and the value of the second average acceleration).

Therefore, when the first average acceleration>0, the first average acceleration<the second average acceleration, and a quotient of the first average acceleration by the second average acceleration<a fourth threshold, the moving device determines that the collision type is horizontal collision.

By using the foregoing steps, after a moving device determines that collision happens, the moving device may preliminarily determine a collision type, and add the collision type to collision information, and send the collision information together with the collision type to the collision judgment device by using a control device.

In this embodiment, after a moving device determines that collision happens, the moving device determines a collision type corresponding to the collision according to a direction of a first average acceleration and a size relationship between a value of the first average acceleration and a value of a second average acceleration, and sends the collision type to the collision judgment device, so that the collision judgment device further determines an active party and a passive party that are in a process of the collision.

In another possible implementation, an angular velocity sensor may be further set in a moving device, and the angular velocity sensor may collect deflection information that is in a movement process of the moving device. The deflection information includes a deflection angle and a deflection direction. When the moving device deflects anticlockwise, the deflection direction is a positive number, and when the moving device deflects clockwise, the deflection direction is a negative number.

Figure 7F:
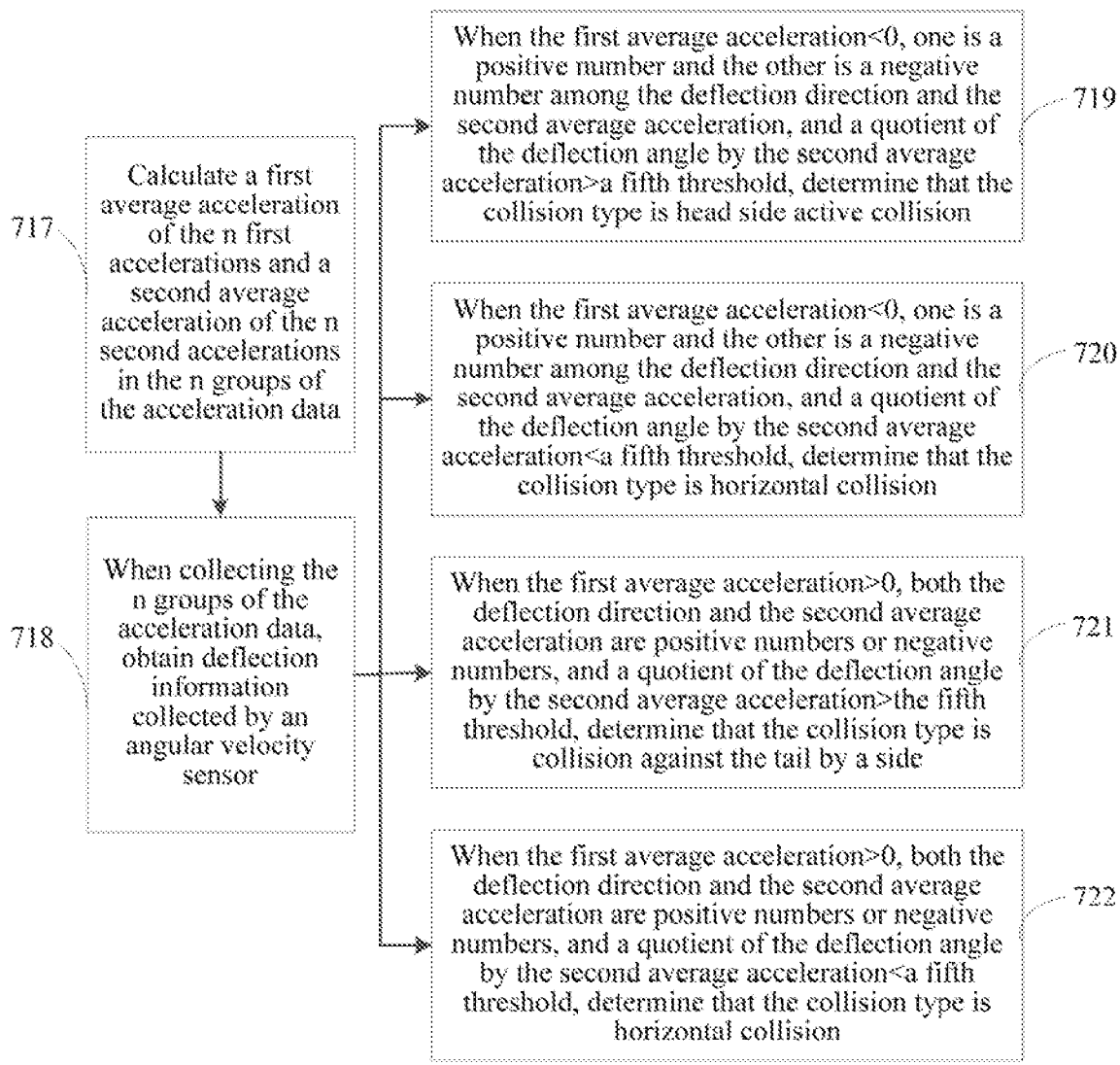

As shown in FIG. 7F, step 710 to step 716 may be replaced with step 717 to step 722. It should be noted that, for convenience of description, as shown in FIG. 7B, the following embodiment provides descriptions by using an example in which a positive direction of the deflection angle may be the anticlockwise direction, and does not constitute a limitation on the present disclosure.

Step 717: Calculate a first average acceleration of the n first accelerations and a second average acceleration of the n second accelerations in the n groups of the acceleration data.

An implementation of this step is similar to that of step 710, and details are not described herein again.

Step 718: When collecting then groups of the acceleration data, obtain deflection information collected by an angular velocity sensor.

When collecting the n groups of the acceleration data, the moving device performs angular velocity integration on angular velocity data collected by the angular velocity sensor, to obtain a deflection angle that is of the moving device and that is during the collection of the n groups of the acceleration data.

Step 719: When the first average acceleration<0, one is a positive number and the other is a negative number among the deflection direction and the second average acceleration (i.e., one of the deflection direction and the second average acceleration is a negative number and the other one of the deflection direction and the second average acceleration is a positive number), and a quotient of the deflection angle by the second average acceleration>a fifth threshold, determine that the collision type is head side active collision.

As shown in FIG. 7E(b), when the moving device A uses a side of the head to collide with a side of the tail of the moving device B from a side, the moving device A undergoes a leftwards force (the second average acceleration is negative), causing the head to deflect in the anticlockwise direction (the deflection direction is positive), and the leftwards force acts on the head, causing the magnitude of the leftwards force to exert relatively large impact on the deflection angle (the quotient of the deflection angle by the second average acceleration is relatively large).

Therefore, when the first average acceleration<0, one is a positive number and the other is a negative number among the deflection direction and the second average acceleration, and a quotient of the deflection angle by the second average acceleration>a fifth threshold, it is determined that the collision type is head side active collision.

Step 720: When the first average acceleration<0, one is a positive number and the other is a negative number among the deflection direction and the second average acceleration, and a quotient of the deflection angle by the second average acceleration<a fifth threshold, determine that the collision type is horizontal collision.

As shown in FIG. 7E(c), when the moving device A uses a side to collide with a side of the moving device B, the moving device A undergoes a leftwards force (the second average acceleration is negative), causing the car body of the moving device A to deflect in the anticlockwise direction (the deflection direction is positive). However, the leftwards force acts on a side of the car body, causing the magnitude of the leftwards force to exert relatively small impact on the deflection angle (the quotient of the deflection angle by the second average acceleration is relatively small).

Therefore, when the first average acceleration<0, one is a positive number and the other is a negative number among the deflection direction and the second average acceleration, and a quotient of the deflection angle by the second average acceleration<a fifth threshold, it is determined that the collision type is horizontal collision.

Step 721: When the first average acceleration>0, both the deflection direction and the second average acceleration are positive numbers or negative numbers, and a quotient of the deflection angle by the second average acceleration>the fifth threshold, determine that the collision type is collision against the tail by a side.

As shown in FIG. 7E(e), when a side of the tail of the moving device A is collided with by the moving device B by using a side of the head, the moving device A undergoes a rightwards force (the second average acceleration is positive), causing the tail to deflect in the anticlockwise direction (the deflection direction is positive), and the rightwards force acts on the tail, causing the magnitude of the rightwards force to exert relatively large impact on the deflection angle (the quotient of the deflection angle by the second average acceleration is relatively large).

Therefore, when the first average acceleration>0, both the deflection direction and the second average acceleration are positive numbers or negative numbers, and a quotient of the deflection angle by the second average acceleration>the fifth threshold, it is determined that the collision type is collision against the tail by a side.

Step 722: When the first average acceleration>0, both the deflection direction and the second average acceleration are positive numbers or negative numbers, and a quotient of the deflection angle by the second average acceleration<a fifth threshold, determine that the collision type is horizontal collision.

As shown in FIG. 7E(f), when a side of the car body of the moving device A is collided with by the moving device B by using a side, the moving device A undergoes a rightwards force (the second average acceleration is positive), causing the tail to deflect in the anticlockwise direction (the deflection direction is positive), and the rightwards force acts on the side of the car body, causing the magnitude of the rightwards force to exert relatively small impact on the deflection angle (the quotient of the deflection angle by the second average acceleration is relatively small).

Therefore, when the first average acceleration>0, both the deflection direction and the second average acceleration are positive numbers or negative numbers, and a quotient of the deflection angle by the second average acceleration<a fifth threshold, it is determined that the collision type is horizontal collision.

In this embodiment, after determining that collision happens, a moving device, analyzes a collision type according to data collected by an acceleration sensor and an angular velocity sensor. A result of the analysis is more accurate than that of an analysis performed according only to data collected by the acceleration sensor.

Correspondingly, after determining that at least two moving devices collide with each other, the collision judgment device determines collision statuses of the moving devices according to collision types carried in collision information corresponding to the moving devices. After step 709, the method may further include the following steps.

Step 723: When the collision types carried in the at least two control devices are different, determine respective collision statuses of the moving devices according to the collision types, where the collision statuses include an active collision state and a passive collision state.

When collision types carried in at least two pieces of received collision information are different, that is, when the collision information not only includes both an active collision type, but also includes a passive collision type, the collision judgment device determines the collision statuses of the moving devices according to collision types reported by the moving devices.

For example, when detecting that a collision type carried in collision information sent by a first moving device is head front active collision, and a collision type carried in collision information sent by a second moving device is collision with the front by the tail, the collision judgment device determines that the first moving device is in the active collision state, and the second moving device is in the passive collision state.

Step 724: When the collision types carried in the collision information sent by the at least two control devices are the same, and are all the head front active collision, determine that the at least two moving devices are in the active collision state.

When at least two moving devices collide head-on with each other, all collision types received by the collision judgment device are head front active collision, and the collision judgment device determines that all of the at least two moving devices are in the active collision state.

Step 725: When the collision types carried in the collision information sent by the at least two control devices are the same, and both are the head side active collision or the horizontal collision, determine that the moving device having the maximum deflection angle is in the passive collision state, and except the moving device having the maximum deflection angle, the rest of the moving devices is in the active collision state.

When sides of at least two moving devices collide with each other, the at least two moving devices determine that all collision types of the at least two moving devices are head side active collision or horizontal collision. For the collision judgment device to conveniently determine an active party and a passive party, the moving devices need further to add collected deflection information to the collision information, and send the collected deflection information together with the collision information to the collision judgment device. The collision judgment device obtains deflection information carried in the collision information, and determines that a moving device whose deflection angle is larger is a moving device that is bounced off after the collision, where a collision status of this moving device is the passive collision state; and determines that a moving device whose deflection angle is smaller is a moving device that actively collides, where a collision status of this moving device is the active collision state.

It should be noted that, after determining active and passive collision statuses of the colliding at least two moving devices, the collision judgment device may send the active and passive collision statuses to control devices corresponding to the moving devices, and the control devices perform corresponding score calculation or send corresponding control instructions to the moving devices according to the active and passive collision statuses. For example, when a control device determines that a moving device is in the active collision state, the control device increases a score of the moving device by 1; when a control device determines that a moving device is in the passive collision state, the control device reduces a score of the moving device by 1. For another example, when a control device determines that a moving device is in the active collision state, the control device sends a battle instruction to the moving device, to instruct the moving device to continue a battle; when a control device determines that a moving device is in the passive collision state, the control device sends a battle stop instruction to the moving device, to instruct the moving device to stop a battle. The present disclosure does not limit an operation performed by the collision judgment device after determining a collision status of a moving device.

When the collision judgment device sends a battle start instruction to moving devices by using control devices, an RTT (Round-Trip Time, round-trip time) is generated, causing a delay for the battle start instruction to reach the different moving devices. To make respective clocks of the moving devices synchronous with a clock of the collision judgment device, the control devices need to obtain communication delays between the moving devices and the collision judgment device, and notify the moving devices of the communication delays, so that the moving devices perform clock synchronization.

Figure 7G:
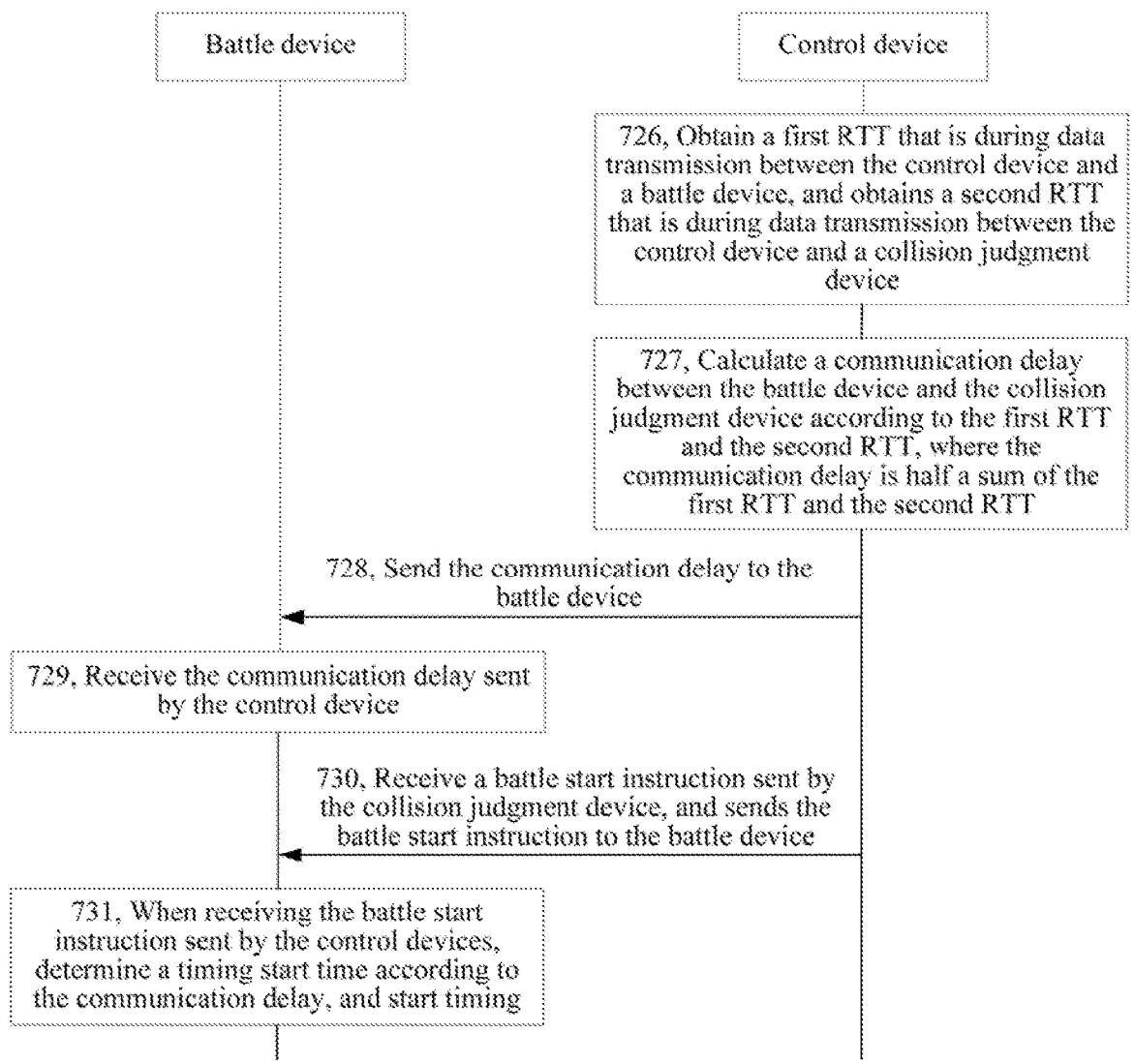
FIG. 7G is a flowchart of a communication delay determining process according to the collision judgment method provided in FIG. 7A.

In a possible implementation, as shown in FIG. 7G, before step 701, the method further includes the following steps.

Step 726: A control device obtains a first RTT that is during data transmission between the control device and a moving device, and obtains a second RTT that is during data transmission between the control device and a collision judgment device.

After establishing a connection to a moving device, a control device may send ping to the moving device according to a predetermined frequency. After receiving the ping, the moving device returns pong to the control device by using the connection, and the control device obtains, according to a time of sending the ping and a time of receiving the pong, an RTT of this transmission. Due to instability of the connection between the control device and the moving device, the RTT changes within a predetermined interval, and therefore the control device may determine an average value of RTTs obtained for multiple times as a first RTT.

Similar to a process of determining the first RTT, the control device determines a second RTT between the control device and the collision judgment device according to a manner of sending the ping and receiving the pong.

It should be noted that, the control device may alternatively determine, as the first RTT, an RTT that is between the control device and the moving device and that is most recently obtained, and determine, as a second RTT, an RTT that is between the control device and the collision judgment device and that is most recently obtained. This is not limited in the present disclosure.

Step 727: The control device calculates a communication delay between the moving device and the collision judgment device according to the first RTT and the second RTT, where the communication delay is half a sum of the first RTT and the second RTT.

The control device further determines a communication delay between the moving device and the collision judgment device according to the first RTT and the second RTT, where the communication delay is half the sum of the first RTT and the second RTT.

Step 728: The control device sends the communication delay to the moving device.

After determining the communication delay, the control device sends the communication delay to the moving device.

Step 729: The moving device receives the communication delay sent by the control device.

Step 730: The control device receives a battle start instruction sent by the collision judgment device, and sends the battle start instruction to the moving device.

Before a battle starts, the collision judgment device sends a battle start instruction to moving devices by using control devices, and the moving devices start the battle after receiving the instruction.

Step 731: When receiving the battle start instruction sent by the control devices, the moving devices determine a timing start time according to the communication delay, and start timing.

The collision judgment device sends the battle start instruction to the moving devices by using the control devices, to instruct the moving devices to start the battle. However, because the communication delay exists, a moment when the collision judgment device sends the battle start instruction is not a moment when the moving devices receive the battle start instruction. In this case, the moving devices need to perform clock synchronization according to the communication delay between the moving devices and the collision judgment device and a clock of the collision judgment device, determine the received communication delay as the timing start time, and start the timing.

For example, the communication delay that is sent by the control devices and that is received by the moving devices is 20 ms, and after receiving the battle start instruction forwarded by the control devices, the moving devices start the time from 20 ms.

In the foregoing steps, due to instability of wireless transmission, the communication delay determined by the control devices according to the first RTT and the second RTT is not a real-time communication delay between the moving devices and the collision judgment device. When two moving devices collide with each other, a collision time received by the collision judgment device should have been the same. However, because the communication delay is inaccurate, actually there is a deviation between collision times received by the collision judgment device. The deviation is a clock deviation between the two moving devices. During a relatively short time, the collision judgment device has received more than two collision times that are close to each other. The collision times sent by the two colliding moving devices are different, causing a matching error of the collision judgment device. To prevent this matching error, the collision judgment device needs to perform clock correction at a proper moment. In a possible implementation, the method may further include the following steps.

Step 732: When detecting that collision between the moving devices happens only once within a predetermined time segment, the collision judgment device determines clock deviations between each collided pair of the at least two moving devices according to the collision time carried in the collision information.

Generally, the predetermined time segment is set according to a mode of a connection between a moving device and a control device and a mode of a connection between a control device and the collision judgment device. For example, if a Bluetooth connection is used between a moving device and a control device and between a control device and the collision judgment device, because a maximum delay of the Bluetooth connection is 500 ms, the predetermined time segment may be set to 1000 ms. When moving devices collide with each other only once within the predetermined time segment, a judgment error does not occur on the collision judgment device.

The collision judgment device may determine the clock deviation between the colliding at least two moving devices according to the collision times carried in the collision information, and the determined clock deviation is correct.

Figure 7H:
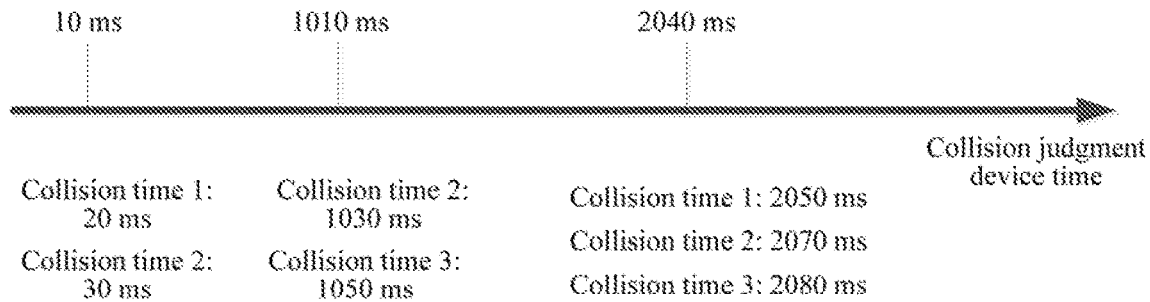
FIG. 7H is a schematic diagram of implementation of the collision judgment method provided in FIG. 7A.

For example, as shown in FIG. 7H, at 10 ms (the first collision), a collision judgment device detects that a collision time 1 carried in collision information sent by a first control device (corresponding to a first moving device) is 20 ms, and a collision time 2 carried in collision information sent by a second control device (corresponding to a second moving device) is 30 ms; and at 1010 ms (the second collision), the collision judgment device detects that the collision time 2 carried in the collision information sent by the second control device is 1030 ms, and a collision time 3 carried in collision information sent by a third control device (corresponding to a third moving device) is 1050 ms. An interval between the first collision and the second collision is greater than a preset time segment (1000 ms), and therefore the collision judgment device determines that a clock deviation between the first moving device and the second moving device is 302−0=10 ms.

Step 733: The collision judgment device stores the clock deviations between the moving devices.

After determining the clock deviations between the moving devices, the collision judgment device stores a correspondence between the moving devices and the clock deviations. The correspondence may be shown in Table 2.

TABLE 2

|  | First moving device | Second moving device | Third moving device |
| --- | --- | --- | --- |
| First moving device | 0 | 10 ms | 30 ms |
| Second moving device | 10 ms | 0 | 20 ms |
| Third moving device | 30 ms | 20 ms | 0 |

Obviously, when a system includes N moving devices, after N−1 different collisions (moving devices in any two collisions are different), the collision judgment device may determine clock deviations between the moving devices in the system.

Figure 7I:
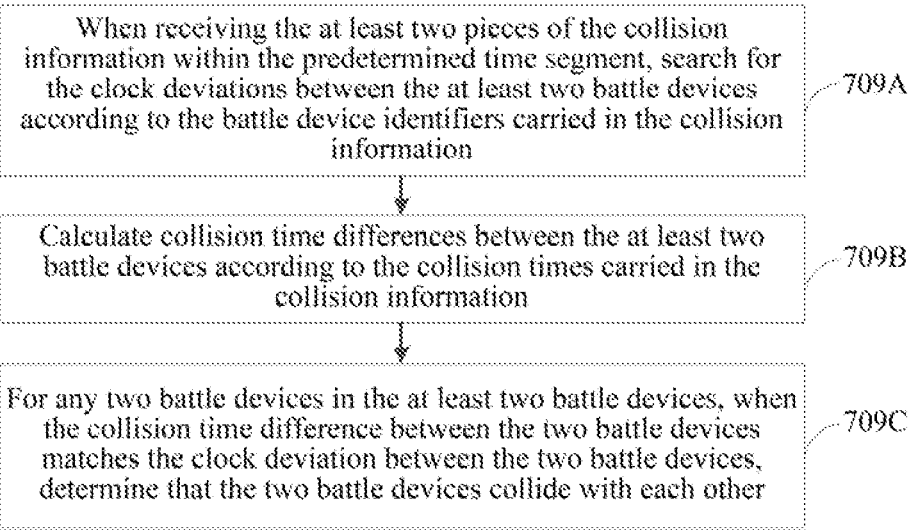
FIG. 7I is a flowchart of a collision matching process according to the collision judgment method provided in FIG. 7A.

Correspondingly, when the collision judgment device perform collision matching, as shown in FIG. 7I, step 709 may include the following steps.

Step 709A: When receiving the at least two pieces of the collision information within the predetermined time segment, the collision judgment device searches for the clock deviations between the at least two moving devices according to the moving device identifiers carried in the collision information.

For example, as shown in FIG. 7H, the collision judgment device determines clock deviations between the first moving device, the second moving device, and the third moving device according to the first collision (10 ms) and the second collision (1010 ms), as shown in Table 2. In the third collision (2040 ms), moving device identifiers carried in collision information received by the collision judgment device are the first moving device, the second moving device, and the third moving device, and it is found that a first clock deviation between the first moving device and the second moving device is 10 ms, a second clock deviation between the first moving device and the third moving device is 30 ms, and a third clock deviation between the second moving device and the third moving device is 20 ms.

Step 709B: The collision judgment device calculates collision time differences between the at least two moving devices according to the collision times carried in the collision information.

As shown in FIG. 7H, the collision judgment device obtains a first collision time difference 20 ms between the first moving device and the second moving device, a second collision time difference 30 ms between the first moving device and the third moving device, and a third collision time difference 10 ms between the second moving device and the third moving device.

Step 709C: For a pair of moving devices in the at least two moving devices, when the collision time difference between the pair of moving devices matches the clock deviation between the pair of moving devices, the collision judgment device determines that the two moving devices collided with each other.

The second collision time difference matches the second clock deviation. Therefore, the collision judgment device determines that the first moving device and the third moving device collide with each other, and the second moving device collides with an obstacle.

Obviously, if the collision judgment device does not calculate the clock deviations between the moving devices, in the third collision, the collision judgment device may determine two moving devices (the second moving device and the third moving device) whose collision times are close to each other as moving devices that collide with each other.

In this embodiment, the collision judgment device calculates clock deviations between moving devices, so as to determine the clock deviations between the moving devices in a system, and perform collision matching according to the clock deviations, obviously increasing accuracy of the collision matching.

The following are apparatus embodiments of the present disclosure. For details that are not described in the apparatus embodiments, refer to the foregoing method embodiments that are in a one-to-one correspondence with the apparatus embodiments.

Figure 8:
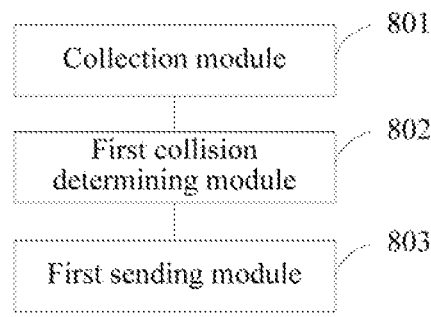
FIG. 8 is a structural block diagram of a collision judgment apparatus according to an embodiment of the present disclosure.

Referring to FIG. 8, FIG. 8 is a structural block diagram of a collision judgment apparatus according to an embodiment of the present disclosure. The collision judgment apparatus becomes the entirety or a portion of the moving device 110 in FIG. 1 by using software, hardware, or a combination of software and hardware. The collision judgment apparatus includes:

a collection module 801, configured to collect acceleration data by using the acceleration sensor;

a first collision determining module 802, configured to determine, according to the acceleration data, whether the moving device collides; and a first sending module 803, configured to: when determining that the moving device collides, send collision information to a corresponding control device, where the collision information includes at least a moving device identifier and a collision time, the control device is configured to send the collision information to a collision judgment device, and the collision judgment device is configured to: detect whether the collision information sent by the at least two control devices is received within a predetermined time interval, and when the collision information sent by the at least two control devices is received within the predetermined time interval, and a difference between the collision times carried in at least two pieces of the collision information is less than a preset threshold, determine that the moving devices corresponding to the moving device identifiers carried in the at least two pieces of the collision information collide with each other.

In summary, according to the collision judgment apparatus provided in this embodiment, a moving device determines, according to acceleration data collected by an acceleration sensor, whether collision happens. When it is determined that the collision happens, a control device sends collision information to a collision judgment device. When the collision judgment device receives at least two pieces of collision information within a predetermined time interval and collision times carried in the collision information are close to each other, the collision judgment device determines that the at least two moving devices collide with each other. In this way, a problem that in a related technology, a moving device can only determine whether collision happens but cannot determine a collision object type, and a relatively large collision detection blind area exists. Effects are achieved, and the effects are: a collision judgment device can determine, according to collision times sent by moving devices, collision happening between the moving devices, a collision detection blind area does not exist, and collision judgment accuracy is increased.

Figure 9:
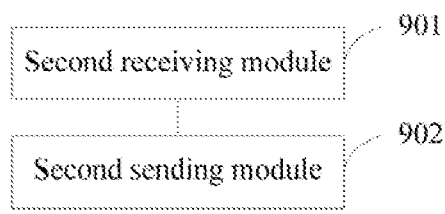
FIG. 9 is a structural block diagram of a collision judgment apparatus according to another embodiment of the present disclosure.

Referring to FIG. 9, FIG. 9 is a structural block diagram of a collision judgment apparatus according to another embodiment of the present disclosure. The collision judgment apparatus becomes the entirety or a portion of the control device 120 in FIG. 1 by using software, hardware, or a combination of software and hardware. The collision judgment apparatus includes:

a second receiving module 901, configured to receive collision information sent by a corresponding moving device, where the collision information is sent by the moving device when the moving device determines, according to acceleration data collected by an acceleration sensor, that collision happens, and the collision information includes at least a moving device identifier and a collision time; and a second sending module 902, configured to: send the collision information to a collision judgment device, where the collision judgment device is configured to: detect whether the collision information sent by the at least two control devices is received within a predetermined time interval; and when the collision information sent by the at least two control devices is received within the predetermined time interval, and a difference between the collision times carried in the at least two pieces of collision information is less than a preset threshold, determine that the moving devices corresponding to the moving device identifiers carried in the at least two pieces of collision information collide with each other.

In summary, according to the collision judgment apparatus provided in this embodiment, a moving device determines, according to acceleration data collected by an acceleration sensor, whether collision happens. When it is determined that the collision happens, a control device sends collision information to a collision judgment device. When the collision judgment device receives at least two pieces of collision information within a predetermined time interval and collision times carried in the collision information are close to each other, the collision judgment device determines that the at least two moving devices collide with each other. In this way, a problem that in a related technology, a moving device can only determine whether collision happens but cannot determine a collision object type, and a relatively large collision detection blind area exists. Effects are achieved, and the effects are: a collision judgment device can determine, according to collision times sent by moving devices, collision happening between the moving devices, a collision detection blind area does not exist, and collision judgment accuracy is increased.

Figure 10:
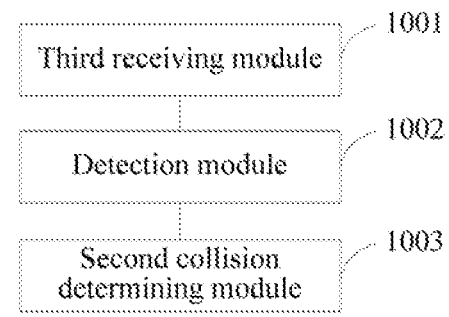
FIG. 10 is a structural block diagram of a collision judgment apparatus according to still another embodiment of the present disclosure.

Referring to FIG. 10, FIG. 10 is a structural block diagram of a collision judgment apparatus according to still another embodiment of the present disclosure. The collision judgment apparatus becomes the entirety or a portion of the collision judgment device 130 in FIG. 1 by using software, hardware, or a combination of software and hardware. The collision judgment apparatus includes:

a third receiving module 1001, configured to receive collision information sent by a control device, where the collision information is sent by a moving device to the control device when the moving device determines, according to acceleration data collected by an acceleration sensor, that collision happens, and the collision information includes at least a moving device identifier and a collision time;

a detection module 1002, configured to detect whether the collision information sent by the at least two control devices is received within a predetermined time interval; and a second collision determining module 1003, configured to: when the collision information sent by the at least two control devices is received within the predetermined time interval, and a difference between the collision times carried in at least two pieces of the collision information is less than a preset threshold, determine that the moving devices corresponding to the moving device identifiers carried in the at least two pieces of the collision information collide with each other.

In summary, according to the collision judgment apparatus provided in this embodiment, a moving device determines, according to acceleration data collected by an acceleration sensor, whether collision happens. When it is determined that the collision happens, a control device sends collision information to a collision judgment device. When the collision judgment device receives at least two pieces of collision information within a predetermined time interval and collision times carried in the collision information are close to each other, the collision judgment device determines that the at least two moving devices collide with each other. In this way, a problem that in a related technology, a moving device can only determine whether collision happens but cannot determine a collision object type, and a relatively large collision detection blind area exists. Effects are achieved, and the effects are: a collision judgment device can determine, according to collision times sent by moving devices, collision happening between the moving devices, a collision detection blind area does not exist, and collision judgment accuracy is increased.

Figure 11:
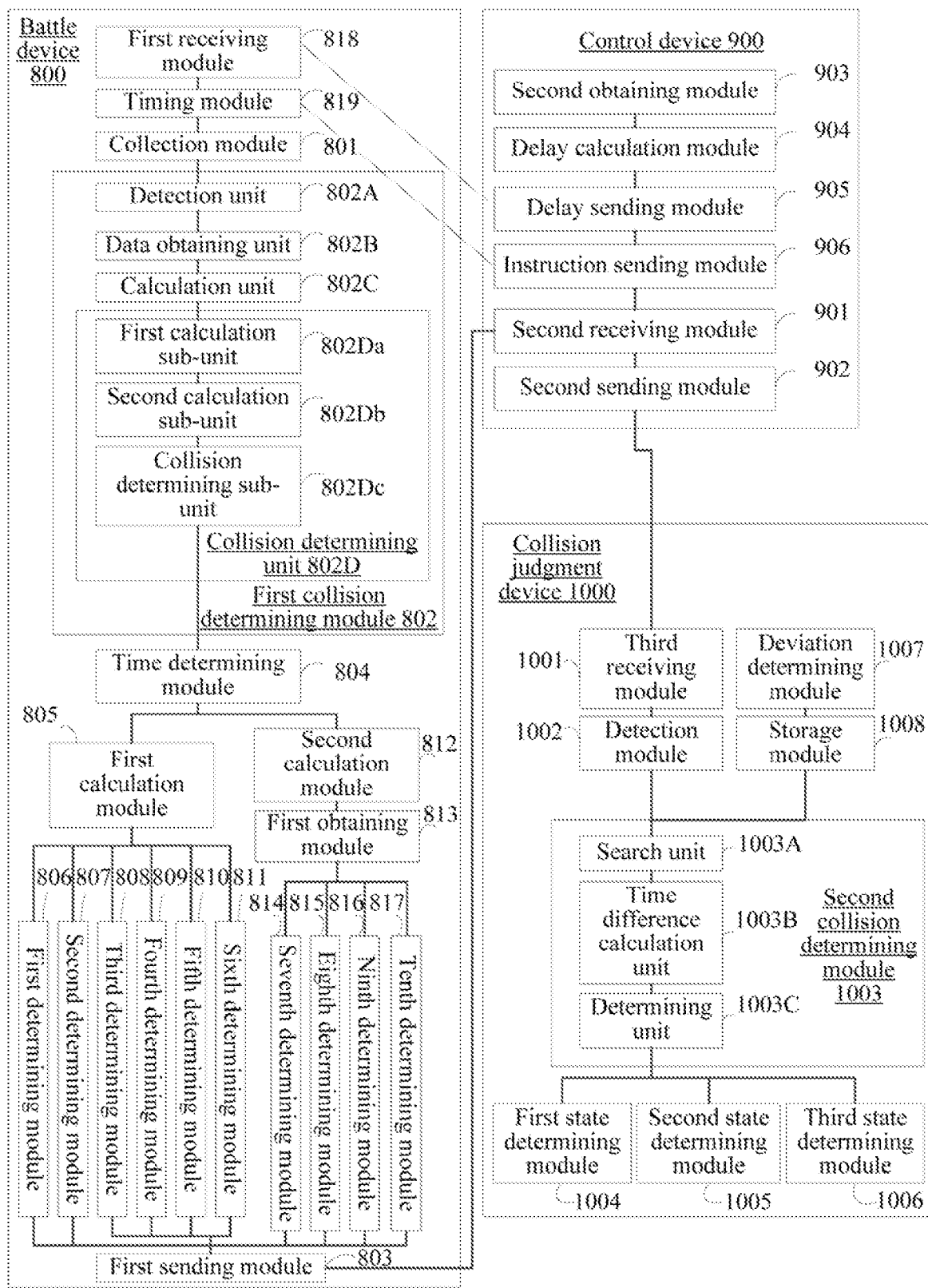
FIG. 11 is a schematic architectural diagram of a collision judgment system according to an embodiment of the present disclosure.

Referring to FIG. 11, FIG. 11 is a schematic architectural diagram of a collision judgment system according to an embodiment of the present disclosure. The collision judgment system includes: a moving device 800, a control device 900, and a collision judgment device 1000.

The moving device 800 includes:

a collection module 801, configured to collect acceleration data by using the acceleration sensor;

a first collision determining module 802, configured to determine, according to the acceleration data, whether the moving device collides; and a first sending module 803, configured to: when determining that the moving device collides, send collision information to a corresponding control device, where the collision information includes at least a moving device identifier and a collision time, the control device is configured to send the collision information to a collision judgment device, and the collision judgment device is configured to: detect whether the collision information sent by the at least two control devices is received within a predetermined time interval, and when the collision information sent by the at least two control devices is received within the predetermined time interval, and a difference between the collision times carried in at least two pieces of the collision information is less than a preset threshold, determine that the moving devices corresponding to the moving device identifiers carried in the at least two pieces of the collision information collide with each other.

Optionally, the acceleration data includes a first acceleration and a second acceleration. A direction of the first acceleration is a forward direction of the moving device, and a direction of the second acceleration is perpendicular to the direction of the first acceleration.

The first collision determining module 802 includes:

a detection unit 802A, configured to detect whether a value of the first acceleration is greater than a first threshold, and/or a value of the second acceleration is greater than a second threshold;

a data obtaining unit 802B, configured to: when the value of the first acceleration is greater than the first threshold, and/or the value of the second acceleration is greater than the second threshold, obtain n groups of the acceleration data that are recently collected, where n≥2, and n is an integer;

a calculation unit 802C, configured to calculate a resultant acceleration according to the value of the first acceleration and the value of the second acceleration that are in each group of the acceleration data; and a collision determining unit 802D, configured to determine, according to the n resultant accelerations obtained through calculation, whether the moving device collides.

Optionally, the moving device obtains an $i^{th}$ resultant acceleration, an $i+1^{th}$ resultant acceleration, an $i+2^{th}$ resultant acceleration, and an $i+3^{th}$ resultant acceleration through calculation according to four consecutive groups of the acceleration data in the n groups of the acceleration data that are recently collected, where i≥1, and i is an integer.

The collision determining unit 802D includes:

a first calculation sub-unit 802Da, configured to calculate a difference between the $i^{th}$ resultant acceleration and the $i+2^{th}$ resultant acceleration to obtain a first slope;

a second calculation sub-unit 802Db, configured to calculate a difference between the $i+1^{th}$ resultant acceleration and the $i+3^{th}$ resultant acceleration to obtain a second slope; and a collision determining sub-unit 802Dc, configured to: when one is a positive number and the other is a negative number among the first slope and the second slope, and a difference between the first slope and the second slope is greater than a third threshold, determine that the moving device collides.

Optionally, the apparatus further includes:

a time determining module 804, configured to: when determining that the moving device collides, determine a time as the collision time, where the time is when it is detected that the value of the first acceleration is greater than the first threshold or the value of the second acceleration is greater than the second threshold.

Optionally, the collision information carries a collision type; and the acceleration data includes a first acceleration and a second acceleration, a direction of the first acceleration is a forward direction of the moving device, and a direction of the second acceleration is perpendicular to the direction of the first acceleration; the apparatus further includes:

a first calculation module 805, configured to calculate a first average acceleration of the n first accelerations and a second average acceleration of the n second accelerations in the n groups of the acceleration data;

a first determining module 806, configured to: when the first average acceleration<0, and the first average acceleration>the second average acceleration, determine that the collision type is head front active collision;

a second determining module 807, configured to: when the first average acceleration<0, the first average acceleration<the second average acceleration, and a quotient of the first average acceleration by the second average acceleration>a fourth threshold, determine that the collision type is head side active collision;

a third determining module 808, configured to: when the first average acceleration<0, the first average acceleration<the second average acceleration, and a quotient of the first average acceleration by the second average acceleration<a fourth threshold, determine that the collision type is horizontal collision;

a fourth determining module 809, configured to: when the first average acceleration>0, and the first average acceleration>the second average acceleration, determine that the collision type is collision against the tail by the front;

a fifth determining module 810, configured to: when the first average acceleration>0, the first average acceleration<the second average acceleration, and a quotient of the first average acceleration by the second average acceleration>a fourth threshold, determine that the collision type is collision against the tail by a side; and a sixth determining module 811, configured to: when the first average acceleration>0, the first average acceleration<the second average acceleration, and a quotient of the first average acceleration by the second average acceleration<a fourth threshold, determine that the collision type is the horizontal collision.

Optionally, the collision information carries a collision type; and the acceleration data includes a first acceleration and a second acceleration, a direction of the first acceleration is a forward direction of the moving device, and a direction of the second acceleration is perpendicular to the direction of the first acceleration; an angular velocity sensor is set in the moving device.

The apparatus further includes:

a second calculation module 812, configured to: calculate, when collision happens, a first average acceleration of the n first accelerations and a second average acceleration of the n second accelerations in n groups of the acceleration data that are recently collected;

a first obtaining module 813, configured to: when collecting the n groups of the acceleration data, obtain deflection information collected by the angular velocity sensor, where the deflection information includes a deflection angle and a deflection direction, where when the moving device anticlockwise deflects, the deflection direction is a positive number, and when the moving device anticlockwise deflects, the deflection direction is a negative number;

a seventh determining module 814, configured to: when the first average acceleration<0, one is a positive number and the other is a negative number among the deflection direction and the second average acceleration, and a quotient of the deflection angle by the second average acceleration>a fifth threshold, determine that the collision type is head side active collision;

an eighth determining module 815, configured to: when the first average acceleration<0, one is a positive number and the other is a negative number among the deflection direction and the second average acceleration, and a quotient of the deflection angle by the second average acceleration<a fifth threshold, determine that the collision type is horizontal collision;

a ninth determining module 816, configured to: when the first average acceleration>0, both the deflection direction and the second average acceleration are positive numbers or negative numbers, and a quotient of the deflection angle by the second average acceleration>the fifth threshold, determine that the collision type is collision against the tail by a side; and a tenth determining module 817, configured to: when the first average acceleration>0, both the deflection direction and the second average acceleration are positive numbers or negative numbers, and a quotient of the deflection angle by the second average acceleration<the fifth threshold, determine that the collision type is horizontal collision.

Optionally, the apparatus further includes:

a first receiving module 818, configured to receive a communication delay sent by the control device, where the communication delay is a delay between the moving device and the collision judgment device, the communication delay is determined by the control device according to a first round-trip time RTT of data transmission to the moving device and a second RTT of data transmission to the collision judgment device, and the communication delay is half a sum of the first RTT and the second RTT; and a timing module 819, configured to: when receiving a battle start instruction sent by the control device, determine a timing start time according to the communication delay, and start timing, where the battle start instruction is sent by the collision judgment device to the control device.

The control device 900 includes:

a second receiving module 901, configured to receive collision information sent by a corresponding moving device, where the collision information is sent by the moving device when the moving device determines, according to acceleration data collected by an acceleration sensor, that collision happens, and the collision information includes at least a moving device identifier and a collision time; and a second sending module 902, configured to: send the collision information to a collision judgment device, where the collision judgment device is configured to: detect whether the collision information sent by the at least two control devices is received within a predetermined time interval; and when the collision information sent by the at least two control devices is received within the predetermined time interval, and a difference between the collision times carried in the at least two pieces of collision information is less than a preset threshold, determine that the moving devices corresponding to the at least two moving device identifiers collide with each other.

Optionally, the apparatus further includes:

a second obtaining module 903, configured to: obtain a first round-trip time RTT of data transmission to the moving device, and obtain a second RTT of data transmission to the collision judgment device;

a delay calculation module 904, configured to calculate a communication delay between the moving device and the collision judgment device according to the first RTT and the second RTT, where the communication delay is half a sum of the first RTT and the second RTT;

a delay sending module 905, configured to send the communication delay to the moving device; and an instruction sending module 906, configured to: receive a battle start instruction sent by the collision judgment device, and send the battle start instruction to the moving device, where the moving device is configured to: when receiving the battle start instruction, determine a timing start time according to the communication delay, and start timing.

The collision judgment device 1000 includes:

a third receiving module 1001, configured to receive collision information sent by a control device, where the collision information is sent by a moving device to the control device when the moving device determines, according to acceleration data collected by an acceleration sensor, that collision happens, and the collision information includes at least a moving device identifier and a collision time;

a detection module 1002, configured to detect whether the collision information sent by the at least two control devices is received within a predetermined time interval; and a second collision determining module 1003, configured to: when the collision information sent by the at least two control devices is received within the predetermined time interval, and a difference between the collision times carried in at least two pieces of the collision information is less than a preset threshold, determine that the moving devices corresponding to the at least two moving device identifiers collide with each other.

Optionally, the collision information carries a collision type, the collision type is determined by the moving device according to the acceleration data, and the collision type includes at least one of head front active collision, head side active collision, horizontal collision, collision against the tail by the front, or collision against the tail by a side.

The apparatus further includes:

a first state determining module 1004, configured to: when the collision types carried in the at least two control devices are different, determine respective collision statuses of the moving devices according to the collision types, where the collision statuses include an active collision state and a passive collision state;

a second state determining module 1005, configured to: when the collision types carried in the collision information sent by the at least two control devices are the same, and are all the head front active collision, determine that the at least two moving devices are in the active collision state; and a third state determining module 1006, configured to: when the collision types carried in the collision information sent by the at least two control devices are the same, and are all the head side active collision or the horizontal collision, determine that the moving device having the maximum deflection angle is in the passive collision state, and except the moving device having the maximum deflection angle, the rest of the moving devices is in the active collision state, where the deflection angle is collected by the moving device by using a built-in angular velocity sensor when the moving device collects n groups of the acceleration data.

Optionally, the apparatus further includes:

a deviation determining module 1007, configured to: when detecting that collision between the moving devices happens only once within a predetermined time segment, determine clock deviations between the colliding at least two moving devices according to the collision time carried in the collision information; and a storage module 1008, configured to store the clock deviations between the moving devices.

Optionally, the second collision determining module 1003 includes:

a search unit 1003A, configured to: when receiving the at least two pieces of the collision information within the predetermined time segment, search for the clock deviations between the at least two moving devices according to the moving device identifiers carried in the collision information;

a time difference calculation unit 1003B, configured to calculate collision time differences between the at least two moving devices according to the collision times carried in the collision information; and a determining unit 1003C, configured to: for any two moving devices in the at least two moving devices, when the collision time difference between the two moving devices matches the clock deviation between the two moving devices, determine that the two moving devices collide with each other.

In summary, according to the collision judgment system provided in this embodiment, a moving device determines, according to acceleration data collected by an acceleration sensor, whether collision happens. When it is determined that the collision happens, a control device sends collision information to a collision judgment device. When the collision judgment device receives at least two pieces of collision information within a predetermined time interval and collision times carried in the collision information are close to each other, the collision judgment device determines that the at least two moving devices collide with each other. In this way, a problem that in a related technology, a moving device can only determine whether collision happens but cannot determine a collision object type, and a relatively large collision detection blind area exists. Effects are achieved, and the effects are: a collision judgment device can determine, according to collision times sent by moving devices, collision happening between the moving devices, a collision detection blind area does not exist, and collision judgment accuracy is increased.

In this embodiment, after a moving device determines that collision happens, the moving device determines a collision type corresponding to the collision according to a direction of a first average acceleration and a size relationship between a value of the first average acceleration and a value of a second average acceleration, and sends the collision type to the collision judgment device, so that the collision judgment device further determines an active party and a passive party that are in a process of the collision.

In this embodiment, after determining that collision happens, a moving device, analyzes a collision type according to data collected by an acceleration sensor and an angular velocity sensor. A result of the analysis is more accurate than that of an analysis performed according only to data collected by the acceleration sensor.

In this embodiment, the collision judgment device calculates clock deviations between moving devices, so as to determine the clock deviations between the moving devices in a system, and perform collision matching according to the clock deviations, obviously increasing accuracy of the collision matching.

A moving device determines, according to acceleration data collected by an acceleration sensor, whether collision happens. When it is determined that the collision happens, a control device sends collision information to a collision judgment device. When the collision judgment device receives at least two pieces of collision information within a predetermined time interval and collision times carried in the collision information are close to each other, the collision judgment device determines that the at least two moving devices collide with each other. In this way, a problem that in a related technology, a moving device can only determine whether collision happens but cannot determine a collision object type, and a relatively large collision detection blind area exists. Effects are achieved, and the effects are: a collision judgment device can determine, according to collision times sent by moving devices, collision happening between the moving devices, a collision detection blind area does not exist, and collision judgment accuracy is increased.

In an embodiment example, a non-temporary computer readable storage medium that includes an instruction is further provided, for example, a memory that includes an example. The instruction may be executed by a processor in a control device or a collision judgment device, to complete the collision judgment method related to a side of the control device or the collision judgment device. Alternatively, the instruction may be executed by a processor in a moving device, to complete the collision judgment method on a side of the moving device. For example, the non-temporary computer readable storage medium may be a ROM, a random access memory (RAM), CD-ROM, a magnetic tape, a floppy disk, or an optical data storage device.

It should be noted that the collision judgment apparatus provided in the foregoing embodiments is described by using the above functional modules only for exemplary purposes. In actual applications, the functions may be allocated to different functional modules according to specific needs, which means that the internal structure of the moving device, the control device, or the collision judgment device is divided to different functional modules to complete all or some of the above described functions. In addition, the collision judgment apparatuses provided by the foregoing embodiments are based on the same concept as the collision judgment methods in the foregoing embodiments. For the specific implementation process, refer to the method embodiments, and the details are not described herein again.

It should be understood that, singular "a", "an", or "the" used in this document is intended to include plural forms, except that the context clearly supports an exception. It should be further understood that, "and/or" used in this document refers to any or all possible combinations that include one or more items that are listed in an associated manner.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A collision judgement method applied to a moving device and a control device, the moving device including an acceleration sensor, the method comprising:

determining, by the moving device, according to acceleration data collected by the acceleration sensor, whether the moving device collides;

upon determining that the moving device collides, sending, by the moving device, collision information to the control device, wherein the collision information includes information on a collision type, and wherein the acceleration data includes a first acceleration and a second acceleration, a direction of the first acceleration is a forward direction of the moving device, and a direction of the second acceleration is perpendicular to the direction of the first acceleration;

calculating, by the moving device when determining that the moving device collides, a first average acceleration of n first accelerations and a second average acceleration of n second accelerations in n groups of the acceleration data that are recently collected;

when the first average acceleration is less than 0, and the first average acceleration is greater than the second average acceleration, determining, by the moving device, that the collision type is head front active collision;

when the first average acceleration is less than 0, the first average acceleration is less than the second average acceleration, and a quotient of the first average acceleration by the second average acceleration is greater than a fourth threshold, determining, by the moving device, that the collision type is head side active collision;

when the first average acceleration is less than 0, the first average acceleration is less than the second average acceleration, and a quotient of the first average acceleration by the second average acceleration is less than a fourth threshold, determining, by the moving device, that the collision type is horizontal collision;

when the first average acceleration is greater than 0, and the first average acceleration is greater than the second average acceleration, determining, by the moving device, that the collision type is collision against the tail by the front;

when the first average acceleration is greater than 0, the first average acceleration is less than the second average acceleration, and a quotient of the first average acceleration by the second average acceleration is greater than a fourth threshold, determining, by the moving device, that the collision type is collision against the tail by a side; and when the first average acceleration is greater than 0, the first average acceleration is less than the second average acceleration, and a quotient of the first average acceleration by the second average acceleration is less than a fourth threshold, determining, by the moving device, that the collision type is the horizontal collision.

2. The method according to claim 1, the method further comprising:

when at least one of a value of the first acceleration is greater than a first threshold or a value of the second acceleration is greater than a second threshold occurs, obtaining, by the moving device, n groups of the acceleration data that are recently collected, wherein n≥2, and n is an integer;

calculating, by the moving device, a resultant acceleration according to the value of the first acceleration and the value of the second acceleration in each of the n groups of the acceleration data to obtain n resultant accelerations;

determining, by the moving device, according to the n resultant accelerations, whether the moving device collides; and when the moving device determines that the moving device collides, determining the collision time as a time when the value of the first acceleration is detected to be greater than the first threshold or the value of the second acceleration is detected to be greater than the second threshold.

3. The method according to claim 1, wherein determining whether the moving device collides comprises:

obtaining, by the moving device, an $i^{th}$ resultant acceleration, an $i+1^{th}$ resultant acceleration, an $i+2^{th}$ resultant acceleration, and an $i+3^{th}$ resultant acceleration according to four consecutive groups of the acceleration data that are recently collected, wherein i≥1, and i is an integer; and calculating, by the moving device, a difference between the $i^{th}$ resultant acceleration and the $i+2^{th}$ resultant acceleration to obtain a first slope;

calculating, by the moving device, a difference between the $i+1^{th}$ resultant acceleration and the $i+3^{th}$ resultant acceleration to obtain a second slope; and when one of the first slope and the second slope is a positive number and the other of the first slope and the second slope is a negative number, and a difference between the first slope and the second slope is greater than a third threshold, determining, by the moving device, that the moving device collides.

4. The method according to claim 1, wherein an angular velocity sensor is set in the moving device, the method further comprising:

when collecting the acceleration data, obtaining, by the moving device, deflection information collected by the angular velocity sensor, wherein the deflection information includes a deflection angle and a deflection direction, wherein when the moving device deflects anticlockwise, the deflection direction is a positive number, and when the moving device deflects clockwise, the deflection direction is a negative number;

calculating, by the moving device, when the moving device collides, a first average acceleration of n first accelerations and a second average acceleration of n second accelerations in n groups of the acceleration data that are recently collected;

when the first average acceleration is less than 0, one of the deflection direction and the second average acceleration is a negative number and the other one of the deflection direction and the second average acceleration is a positive number, and a quotient of the deflection angle by the second average acceleration is greater than a fifth threshold, determining, by the moving device, that the collision type is head side active collision;

when the first average acceleration is less than 0, one of the deflection direction and the second average acceleration is a negative number and the other of the deflection direction and the second average acceleration is a positive number, and a quotient of the deflection angle by the second average acceleration is less than the fifth threshold, determining, by the moving device, that the collision type is horizontal collision;

when the first average acceleration is greater than 0, both the deflection angle and the second average acceleration are positive numbers or negative numbers, and a quotient of the deflection angle by the second average acceleration is greater than the fifth threshold, determining, by the moving device, that the collision type is collision against the tail by a side; and when the first average acceleration is greater than 0, both the deflection angle and the second average acceleration are positive numbers or negative numbers, and a quotient of the deflection angle by the second average acceleration is less than the fifth threshold, determining, by the moving device, that the collision type is horizontal collision.

5. The method according to claim 1, applied further to a collision judgment device, the method further comprising:

obtaining, by the control device, a first RTT (round-trip time) of data transmission to the moving device;

obtaining, by the control device, a second RTT of data transmission to the collision judgment device;

calculating, by the control device, a communication delay between the moving device and the collision judgment device according to the first RTT and the second RTT, wherein the communication delay is half of a sum of the first RTT and the second RTT;

sending, by the control device, the communication delay to the moving device; and receiving, by the moving device, the communication delay; and when receiving a start instruction sent by the control device, determining, by the moving device, a start time according to the communication delay, and start timing, wherein the start instruction is sent by the collision judgment device to the control device.

6. A control device in communication with a moving device, the moving device including an acceleration sensor, the control device, comprising: a memory and a processor coupled to the processor, the processor being configured to perform:

after determining by the moving device and according to acceleration data collected by the acceleration sensor that the moving device collides, receiving collision information from the moving device, wherein the collision information includes information on a collision type, wherein the acceleration data includes a first acceleration and a second acceleration, a direction of the first acceleration is a forward direction of the moving device, and a direction of the second acceleration is perpendicular to the direction of the first acceleration;

calculating, when determining that the moving device collides, a first average acceleration of n first accelerations and a second average acceleration of n second accelerations in n groups of the acceleration data that are recently collected;

when the first average acceleration is less than 0, and the first average acceleration is greater than the second average acceleration, determining that the collision type is head front active collision;

when the first average acceleration is less than 0, the first average acceleration is less than the second average acceleration, and a quotient of the first average acceleration by the second average acceleration is greater than a fourth threshold, determining that the collision type is head side active collision;

when the first average acceleration is less than 0, the first average acceleration is less than the second average acceleration, and a quotient of the first average acceleration by the second average acceleration is less than a fourth threshold, determining that the collision type is horizontal collision;

when the first average acceleration is greater than 0, and the first average acceleration is greater than the second average acceleration, determining that the collision type is collision against the tail by the front;

when the first average acceleration is greater than 0, the first average acceleration is less than the second average acceleration, and a quotient of the first average acceleration by the second average acceleration is greater than a fourth threshold, determining that the collision type is collision against the tail by a side; and when the first average acceleration is greater than 0, the first average acceleration is less than the second average acceleration, and a quotient of the first average acceleration by the second average acceleration is less than a fourth threshold, determining that the collision type is the horizontal collision.

7. The apparatus according to claim 6, wherein determining that the moving device collides comprises:

detecting whether a value of the first acceleration is greater than a first threshold, and/or a value of the second acceleration is greater than a second threshold;

upon determining that at least one of a value of the first acceleration is greater than a first threshold or a value of the second acceleration is greater than a second threshold, obtaining n groups of the acceleration data that are recently collected, wherein n≥2, and n is an integer;

calculating a resultant acceleration according to the value of the first acceleration and the value of the second acceleration in each of then groups of the acceleration data to obtain n resultant accelerations; and determining, according to the n resultant accelerations, that the moving device collides.

8. The apparatus according to claim 6, wherein determining that the moving device collides comprises:

obtaining an ith resultant acceleration, an $i^{th}$ resultant acceleration, an $i+2^{th}$ resultant acceleration, and an $i+3^{th}$ resultant acceleration according to four consecutive groups of the acceleration data that are recently collected, wherein i≥1, and i is an integer;

calculating a difference between the ith resultant acceleration and the $i+2^{th}$ resultant acceleration to obtain a first slope;

calculating a difference between the $i+1^{th}$ resultant acceleration and the $i+3^{th}$ resultant acceleration to obtain a second slope; and when one of the first slope and the second slope is a positive number and the other one of the first slope and the second slope is a negative number, and a difference between the first slope and the second slope is greater than a third threshold, determining that the moving device collides.

9. The apparatus according to claim 6, wherein the processor is further configured for:

when the moving device collides at a collision time, determining the collision time as a time when a value of the first acceleration is detected to be greater than a first threshold or a value of the second acceleration is detected to be greater than a second threshold.

10. The apparatus according to claim 6, further comprising: an angular velocity sensor, wherein the processor is further configured for:

calculating a first average acceleration of n first accelerations and a second average acceleration of n second accelerations in n groups of the acceleration data that are recently collected;

when collecting the n groups of the acceleration data, obtaining deflection information collected by the angular velocity sensor, wherein the deflection information includes a deflection angle and a deflection direction, wherein when the moving device deflects anticlockwise, the deflection direction is a positive number, and when the moving device deflects clockwise, the deflection direction is a negative number;

when the first average acceleration is less than 0, one of the deflection direction and the second average acceleration is a negative number and the other one of the deflection direction and the second average acceleration is a positive number, and a quotient of the deflection angle by the second average acceleration is greater than a fifth threshold, determining that the collision type is head side active collision;

when the first average acceleration is less than 0, one of the deflection direction and the second average acceleration is a negative number and the other one of the deflection direction and the second average acceleration is a positive number, and a quotient of the deflection angle by the second average acceleration is less than the fifth threshold, determining that the collision type is horizontal collision;

when the first average acceleration is greater than 0, both the deflection direction and the second average acceleration are positive numbers or negative numbers, and a quotient of the deflection angle by the second average acceleration is greater than the fifth threshold, determining that the collision type is collision against the tail by a side; and when the first average acceleration is greater than 0, both the deflection direction and the second average acceleration are positive numbers or negative numbers, and a quotient of the deflection angle by the second average acceleration is less than the fifth threshold, determining that the collision type is horizontal collision.

11. The apparatus according to claim 6, wherein the processor is further configured for:
receiving a communication delay sent by the control device, wherein the communication delay is a delay between the moving device and a collision judgment device, the communication delay is determined by the control device according to a first round-trip time RTT of data transmission to the moving device and a second RTT of data transmission to the collision judgment device, and the communication delay is half a sum of the first RTT and the second RTT; and
when receiving a start instruction sent by the control device, determining a start time according to the communication delay, and starting timing, wherein the start instruction is sent by the collision judgment device to the control device.

12. A collision judgment apparatus, used in a collision judgment device, comprising:
a memory; and a processor coupled to the memory, the processor being configured for:
receiving collision information sent from a moving device via a control device; and
notifying the moving device on whether the moving device collides with a second moving device according to the collision information, wherein the collision information includes information on a collision type and acceleration data collected by the moving device, wherein the acceleration data includes a first acceleration and a second acceleration, a direction of the first acceleration is a forward direction of the moving device, and a direction of the second acceleration is perpendicular to the direction of the first acceleration, and wherein determining the collision type by the moving device includes:
calculating a first average acceleration of n first accelerations and a second average acceleration of n second accelerations in n groups of the acceleration data that are recently collected;
when the first average acceleration is less than 0, and the first average acceleration is greater than the second average acceleration, determining that the collision type is head front active collision;
when the first average acceleration is less than 0, the first average acceleration is less than the second average acceleration, and a quotient of the first average acceleration by the second average acceleration is greater than a fourth threshold, determining that the collision type is head side active collision;
when the first average acceleration is less than 0, the first average acceleration is less than the second average acceleration, and a quotient of the first average acceleration by the second average acceleration is less than a fourth threshold, determining that the collision type is horizontal collision;
when the first average acceleration is greater than 0, and the first average acceleration is greater than the second average acceleration, determining that the collision type is collision against the tail by the front;
when the first average acceleration is greater than 0, the first average acceleration is less than the second average acceleration, and a quotient of the first average acceleration by the second average acceleration is greater than a fourth threshold, determining that the collision type is collision against the tail by a side; and
when the first average acceleration is greater than 0, the first average acceleration is less than the second average acceleration, and a quotient of the first average acceleration by the second average acceleration is less than a fourth threshold, determining that the collision type is the horizontal collision.

13. The collision judgment apparatus according to claim 12, wherein the moving device is a first moving device, and wherein the processor is further configured for:
assigning a first collision type to the first moving device and a second collision type to the second moving device according to the information on collision type; and
determining that the first moving device collides with the second moving type in an active collision or a passive collision according to whether the first collision type is the same as or different than the second collision type.

* * * * *